United States Patent
Zanotti et al.

(10) Patent No.: US 10,615,453 B2
(45) Date of Patent: Apr. 7, 2020

(54) POROUS ELECTROLYTE MEMBRANE, MANUFACTURING PROCESS THEREOF AND ELECTROCHEMICAL DEVICES COMPRISING SAME

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

(72) Inventors: Jean-Marc Zanotti, Chatenay-Malabry (FR); Quentin Berrod, Antony (FR); Jean Dijon, Champagnier (FR); Filippo Ferdeghini, Le Kremlin Bicetre (FR); Patrick Judeinstein, Gif sur Yvette (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 134 days.

(21) Appl. No.: 15/560,516

(22) PCT Filed: Mar. 25, 2016

(86) PCT No.: PCT/EP2016/056732
§ 371 (c)(1),
(2) Date: Sep. 22, 2017

(87) PCT Pub. No.: WO2016/151142
PCT Pub. Date: Sep. 29, 2016

(65) Prior Publication Data
US 2018/0115014 A1    Apr. 26, 2018

(30) Foreign Application Priority Data

Mar. 26, 2015  (FR) .................................. 15 52572

(51) Int. Cl.
*H01M 10/00* (2006.01)
*H01M 10/056* (2010.01)
(Continued)

(52) U.S. Cl.
CPC ...... *H01M 10/056* (2013.01); *B01D 67/0079* (2013.01); *B01D 69/02* (2013.01);
(Continued)

(58) Field of Classification Search
CPC ............ H01M 10/056; H01M 10/052; H01M 2300/0065; B01D 71/021; B01D 69/148;
(Continued)

(56) References Cited

U.S. PATENT DOCUMENTS

2010/0068461 A1 * 3/2010 Wallace .............. B81C 1/00111
428/156
2011/0220574 A1   9/2011 Bakajin et al.
(Continued)

FOREIGN PATENT DOCUMENTS

FR      2 896 716 A1    8/2007
FR      2 963 481 A1    2/2012
(Continued)

OTHER PUBLICATIONS

International Search Report dated Jun. 7, 2016 in PCT/EP2016/056732 filed Mar. 25, 2016.
(Continued)

Primary Examiner — Nicholas P D'Aniello
(74) Attorney, Agent, or Firm — Oblon, McClelland, Maier & Neustadt, L.L.P.

(57) ABSTRACT

A porous electrolyte membrane including a first main surface and a second main surface that are separated by a
(Continued)

thickness, where carbon nanotubes, defining through-pores or through-channels that are open at their two ends, have a diameter smaller than or equal to 100 nm, are oriented in the direction of the thickness of the membrane, and are all substantially parallel over the entire thickness of the membrane, connect the first main surface and the second main surface; the carbon nanotubes are separated by a space, and the space between the carbon nanotubes is completely filled with at least one solid material, and an electrolyte is confined inside the carbon nanotubes. A method for preparing the membrane and an electrochemical device, such as a lithium accumulator or battery, including the electrolyte membrane.

28 Claims, 5 Drawing Sheets

(51) Int. Cl.
| | | |
|---|---|---|
| H01M 10/052 | (2010.01) | |
| B01D 69/14 | (2006.01) | |
| B01D 67/00 | (2006.01) | |
| B01D 69/02 | (2006.01) | |
| B01D 71/02 | (2006.01) | |

(52) U.S. Cl.
CPC ......... *B01D 69/148* (2013.01); *B01D 71/021* (2013.01); *H01M 10/052* (2013.01); *B01D 2325/021* (2013.01); *H01M 2300/0065* (2013.01); *Y02T 10/7011* (2013.01)

(58) Field of Classification Search
CPC ............... B01D 67/0079; B01D 69/02; B01D 2325/021; Y02T 10/7011
See application file for complete search history.

(56) References Cited

U.S. PATENT DOCUMENTS

| | | |
|---|---|---|
| 2011/0253630 A1 | 10/2011 | Bakajin et al. |
| 2013/0189590 A1 | 7/2013 | Jean-Marc et al. |

FOREIGN PATENT DOCUMENTS

| | | |
|---|---|---|
| KR | 10-2014-0010483 A | 1/2014 |
| WO | 2009/148959 A2 | 12/2009 |
| WO | 2012/013603 A1 | 2/2012 |

OTHER PUBLICATIONS

French Search Report dated Jan. 21, 2016 in FR 1552572 filed Mar. 26, 2015.

Nunes-Pereira, J. et al., "Li-ion battery separator membranes based on poly(vinylidene fluoride-trifluoroethylene)/carbon nanotube composites," Solid State Ionics, vol. 249, Aug. 2013, XP028729210, pp. 63-71.

* cited by examiner

POROUS ELECTROLYTE MEMBRANE, MANUFACTURING PROCESS THEREOF AND ELECTROCHEMICAL DEVICES COMPRISING SAME

TECHNICAL FIELD

The invention relates to a porous membrane with an electrolyte, in particular for electrochemical devices.

The invention in particular relates to a membrane with an ionic liquid electrolyte or a polymeric electrolyte, for electrochemical devices.

The invention further relates to a method for preparing said membrane.

The invention also relates to an electrochemical device comprising this membrane with an electrolyte, notably with an ionic liquid electrolyte or with a solid polymeric electrolyte.

This electrochemical device may be in particular, an accumulator with an alkaline metal.

In particular, the invention relates to a lithium battery, notably a lithium metal battery or a lithium-ion battery, comprising said membrane with an electrolyte.

The technical field of the invention may be defined as that of electrochemical devices, notably that of lithium batteries and more specifically that of lithium metal batteries and/or lithium-ion batteries comprising an electrolyte. Such batteries are notably used in electronic devices and in hybrid or electric vehicles.

State of the Prior Art

The accumulators, batteries, applied in hybrid or electric vehicles have to be able to store both a large amount of energy and to provide it in a short period.

As compared with other electrochemical systems for storing energy, lithium batteries provide very high energy densities, generally of the order of 150 Wh/kg, but still moderate powers (1-3 kW/kg), notably because of kinetic factors and/or of a limitation of the transport of the charge carriers within the electrolyte.

The electrolyte may notably be a proton carrier or a proton conductor such as Nafion®, a protonic ionic liquid or an acid dissolved in a polymer, a pure ionic liquid, an ionic liquid containing a ionic conductive salt such as an alkaline salt, a liquid organic solvent or an organic polymer containing an ionic conductor salt, or further a combination of several of the electrolytes which have just been listed.

The electrolytes used in these accumulators, batteries may notably comprise salts dissolved in a liquid or solid medium, such as a polymer, which allows dissociation of these salts into charged species.

For example the electrolytes of metal lithium or lithium-ion accumulators, batteries consist of lithium salts dissolved in a polymeric matrix whence the name of "polymeric electrolyte" or "electrolyte polymer". This is then referred to as a "lithium-polymer" accumulator, battery.

The usual polymers of these polymeric electrolytes are semi-crystalline polymers in which coexist amorphous and crystalline phases, or amorphous polymers or cross-linked polymers. Thus, the polymeric matrix of the lithium metal batteries generally consist of polymers based on Poly(Ethylene Oxide) or POE ("PEO" in English), fitting the formula $[CH_2-CH_2-O]_n$ wherein the value of n is for example of about 3,000.

In the following, "solvent" will generally designate the liquid or solid medium and "electrolyte" will generally designate the medium consisting of the charged species and of the solvent.

Further, for guaranteeing and ensuring the safety of the electrochemical system, such as an accumulator or a battery, for example in order to avoid its inflammation or the leaking of chemical species into the environment, it is important to ensure good mechanical strength of the casing of the electrochemical system and of the electrolyte and a porous matrix or a membrane is used for trapping the electrolyte. The terms of membrane with an electrolyte are then used.

The conductivity of the electrolytes is the product of the concentration of charge carriers by their mobility.

The mobility is proportional to the diffusion coefficient of the charge carriers and therefore inversely proportional to the viscosity of the solvent.

Accordingly, it appears that the power of the electrochemical devices such as accumulators, batteries, is essentially controlled by the viscosity of the electrolyte and the concentration of charge carriers, and therefore it is constantly sought to reduce the viscosity of the electrolyte and to increase the concentration of charge carriers.

In order to increase the concentration of charge carriers, it is necessary to use a solvent in which the salt is soluble and dissociated.

The usual solutions for reducing the viscosity of the electrolyte are the increase in the temperature at which operates the electrochemical system, such as an accumulator, battery, or the addition of plasticizing additives in the polymer when the electrolyte is a solid polymeric electrolyte.

For applications in automobiles, for example, if the electrolyte is an electrolyte polymer, the battery, should be maintained around 80° C.

This constraint is very unfavorable from the point of view of the overall energy yield, limits the field of use of the batteries, comprising such electrolytes to heavy pieces of equipment such as automobile vehicles and prevents any application in the consumer electronics field and notably in computers, MP3 players and all the lightweight and portable electronic apparatuses.

The incorporation of plasticizers in the polymer, gives the possibility of increasing the amorphous phase fraction of the polymer and thereby increasing the ion conductivity but it only gives the possibility of attaining only a still too low conductivity.

Document FR-A1-2 963 481 [1] relates to a mineral membrane with an electrolyte wherein:
- the membrane is a porous membrane made of a metal or metalloid oxide which is an electric insulator comprising a first main surface (1) and a second main surface (2) separated by a thickness (3);
- pores or through-channels (4) open at both of their ends (5,6), of a diameter of less than or equal to 100 nm, oriented in the direction of the thickness (3) of the membrane and all substantially parallel, over the totality of the thickness (3) of the membrane, connect the first main surface (1) and the second main surface (2); and
- an electrolyte is confined in the pores (4) of the membrane.

In this membrane, the pores or channels are generated by chemical etching in the substrate, for example by anodization of an aluminium plate with oxalic acid and then dissolution of the oxide with a mixture of chromic acid and of phosphoric acid.

This membrane still has an insufficient ion conductivity of the electrolyte, and is fragile and brittle since it is not very ductile. Further it is difficult to apply by extrusion processes.

Document WO-A2-2009/148959 [2] relates, according to the abstract, to nanoporous membranes with functionalized carbon nanotubes which are trapped in a matrix material positioned between the carbon nanotubes.

The different uses of the membranes are described in section 4 of the description of document [2].

These are uses in separation and purification methods.

At page 44 of document [2], carbon nanotubes membranes are used for filtering under pressure solutions of electrolytes, i.e. solutions of potassium ferricyanide or of potassium chloride.

In this passage of document [2], the electrolyte solutions circulate in the NTCs so that the ion species are retained, these solutions cross the membrane, and are not confined in the nanotubes.

The membrane is actually here a filtration membrane, which is by no means intended for a use in an electrochemical device, notably in a lithium accumulator, battery like the membrane with an electrolyte according to the invention.

Therefore considering the foregoing, there is no need for a membrane with an electrolyte, notably intended for use in a lithium battery, such as a lithium-metal battery, or lithium-ion battery, which allows improvement in the performances of the existing membranes with electrolytes.

In particular, there exists a need for a membrane with an electrolyte, which has a high and improved ion conductivity, at room temperature, for example which may attain a value of $10^{-1}$ S/cm, without addition of plasticizing additives to the electrolyte.

The goal of the present invention is notably to provide a membrane with an electrolyte, and which inter alia meets these needs.

The goal of the present invention is further to provide a membrane with an electrolyte which does not have the drawbacks, defects, limitations and disadvantages of the membranes with electrolytes of the prior art and which solves the problems of the membranes with electrolytes of the prior art.

In particular, the goal of the present invention is to provide a membrane with an electrolyte which has improved performances, notably as regards the insufficient ion conductivity at room temperature, without it being necessary to add additives such as plasticizing additives, to the electrolyte.

The goal of the present invention is consequently to provide a membrane with an electrolyte which, when it is applied in an battery provides a significant gain in the power delivered by these batteries relatively to the batteries which apply the membranes of the prior art.

DESCRIPTION OF THE INVENTION

This goal and further other ones, are attained, according to the invention, with a porous membrane with an electrolyte comprising a first main surface (21) and a second main surface (22) separated by a thickness (23) wherein:
  carbon nanotubes, defining through pores or through-channels (24) open at both of their ends (25, 26), with a diameter of less than or equal to 100 nm, oriented in the direction of the thickness (23) of the membrane and all substantially parallel, on the totality of the thickness (23) of the membrane, connect the first main surface (21) and the second main surface (22);
  the carbon nanotubes are separated by a space, and said space between the carbon nanotubes is totally filled with at least one solid material; and
  an electrolyte is confined inside the carbon nanotubes.

It should be noted that by «membrane with an electrolyte», one generally refers to the membrane in which the electrolyte is confined inside the carbon nanotubes while by «membrane», one exclusively refers to the membrane as such without any confined electrolyte inside the carbon nanotubes.

By room temperature, it is generally meant a temperature from 15° C. to 30° C., for example from 20° C. to 25° C.

Generally, the electrolyte does not contain any plasticizing agent, is plasticizing agent free.

Advantageously, in the membrane with an electrolyte according to the invention, the electrolyte confined inside the carbon nanotubes fills the totality of the inside of the carbon nanotubes, or more exactly the totality, the entirety of the volume defined by the inside, inside the carbon nanotubes, in other words, the totality, the entirety of the internal volume of the pores or channels.

Unlike document [2], notably page 44, in the membrane with an electrolyte according to the invention, the chemical composition of the confined electrolyte is the same in the whole inside of the carbon nanotubes, or more exactly in all the volume defined by the inside, inside the carbon nanotubes, in other words in all the internal volume of the pores or channels.

Unlike document [2], notably page 44, in the membrane with an electrolyte according to the invention, the chemical composition of the confined electrolyte is the same in every point inside the carbon nanotubes, or more exactly at every point of the volume defined by the interior, inside, inside carbon nanotubes, in other words at any point of the internal volume of the pores or channels.

In other words, unlike document [2], notably page 44, in the membrane with an electrolyte according to the invention, the chemical composition of the confined electrolyte is the same inside the nanotubes over the whole length of the pores or channels, from one end to the other of the nanotubes, pores or channels, and does not vary from one end to the other.

In particular, unlike document [2], notably page 44, in the membrane with an electrolyte according to the invention, the ion conductivity of the confined electrolyte is the same in the whole inside of the carbon nanotubes, or more exactly in all the volume defined by the inside, inside the carbon nanotubes, in other words in the whole internal volume of the pores or channels.

Unlike document [2], notably page 44, in the membrane with an electrolyte according to the invention, the ion conductivity of the confined electrolyte is the same in every point of the inside of the carbon nanotubes, or more exactly at any point of the volume defined by the inside, inside the carbon nanotubes, in other words in any point of the internal volume of the pores or channels.

In other words, unlike document [2], notably page 44, in the membrane with an electrolyte according to the invention, the ion conductivity of the confined electrolyte is the same inside the nanotubes over the whole length of the pores or channels, from one end to the other of the nanotubes, pores or channels and does not vary from one end to the other. This conductivity is the same all along the nanotube, channel or pore and does not change, is not modified, unlike document [2], notably page 44.

In the membrane with an electrolyte according to the invention, this ion conductivity is generally from $10^{-5}$ S·cm to $10^{-1}$ S·cm, preferably from $10^{-4}$ S·cm to $10^{-1}$ S·cm, still preferably from $10^{-2}$ S·cm to $10^{-1}$ S·cm.

In the membrane with an electrolyte according to the invention, the chemical composition of the confined electrolyte is the same as that of the electrolyte before confinement (a so called "bulk" electrolyte).

The chemical composition of the electrolyte inside the nanotubes is the same as the chemical composition of the electrolyte outside the nanotubes.

Unlike document [2], notably page 44, in the membrane with an electrolyte according to the invention, there is no separation, dissociation, exclusion, retention of one of the constitutive elements of the electrolyte, of a portion of the electrolyte, for example during the filling of the nanotubes, at the contact of the nanotubes, and notably at the contact of the internal wall of the carbon nanotubes.

In the membrane with an electrolyte according to the invention, the electrolyte is not chemically modified in any way because of its introduction into the nanotubes.

Since in the membrane with an electrolyte according to the invention, there is no separation, dissociation, exclusion, retention, of one of the constitutive elements of the electrolyte, of a portion of the electrolyte, the ion conductivity does not change, notably does not decrease, all along the nanotube, channel or pore from one end to the other, unlike document [2], notably page 44.

In document [2], notably page 44, there is a rejection of the cations and anions, thus the conductivity is strongly modified from one end to the other of the nanotubes, since there is a reduction in the amount of ions in the solution from one end to the other of the nanotubes.

Further, in the membrane with an electrolyte according to the invention, there does not exist, like in document [2] any pressure difference between the first main surface and the second main surface of the membrane. The pressure is isostatic. The pressure is identical on both sides of the membrane. No pressure difference exists on either side of the membrane, between both of its sides, its two faces, its two main surfaces.

There exist electrochemical devices wherein there is electrolyte, not only inside the channels, tubes, carbon nanotubes, but also further on the outside of the membrane, and of the nanotubes, channels, pores. This electrolyte outside the membrane is in contact with the first main surface of the membrane and/or in contact with the second main surface of the membrane and is generally in fluidic communication with the electrolyte which is found inside the channels, pores, nanotubes. The chemical composition of the electrolyte which is found inside the carbon nanotubes is, according to the invention, the same as the chemical composition of the electrolyte which is found on the outside of the carbon nanotubes ("above" and/or "below" the membrane), since there is, as already discussed above no separation, dissociation, exclusion, retention, of one of the constitutive elements of the electrolyte, of a portion of the electrolyte in the membrane.

This is also the case upon filling the channels, pores, with the electrolyte during the manufacturing of the membrane, when the electrolyte passes from the outside to the inside of the membrane.

Advantageously, the first and the second main surfaces are planar and parallel, the membrane is a planar membrane, and the nanotubes, the pores or channels are substantially aligned, or aligned, perpendicularly to said surface.

As this was already indicated above, the pores are open pores, opening out at their two ends.

These two ends are respectively located at least at the first and at the second main surfaces. In other words, these two ends cannot be located below the level of the first or of the second main surface, inside the membrane.

Both of these ends may respectively be located at the first and at the second main surfaces.

Or else one of these two ends or these two ends may be located respectively beyond the first and the second main surfaces, i.e. that the nanotubes jut out, go beyond, this first main surface and/or this second main surface (this is the case on the appended figures).

There is quasi no limitation on the carbon nanotubes.

However the pores or channels, in other words the core of the nanotubes must not be obstructed, notably by residues of catalyst, for example of ferrocene, or by structural defects of the wall of the nanotubes.

In other words, the channels or pores have to be through-channels or pores between the first main surface of the membrane and the second main surface of the membrane and also not be obstructed, so that the electrolyte circulates without any obstacles in these channels or pores between the first main surface of the membrane and the second main surface of the membrane.

The carbon nanotubes may be selected from among single-walled carbon nanotubes and multi-walled carbon nanotubes.

The carbon nanotubes are electronical conductors, this may limit their use in applications where they have on the contrary to be electron insulators, for example when they have to be used as a separating element of a battery.

In order to make them electronically insulating, the carbon nanotubes have to be functionalized, on their outer wall (wall opposite to the pores, channels) in the case of single-walled carbon nanotubes, or on their outer most wall in the case of multi-walled carbon nanotubes.

Thus, the carbon nanotubes may be functionalized for example by fluorination, or by means of an organic compound which makes them electronically insulating like an aryl diazonium.

In this respect, reference may be made to document FR-A1-2 896 716.

It is also possible to make the membrane electronically insulating by grafting an ion conductor polymer (ICP) with pendant functions compatible (having an affinity) with the electrolyte at at least one of the ends of the CNTs. For example, in the case when the electrolyte comprises an ionic liquid, these pendant functions may be ionic liquid pendant functions. This gives the possibility of having good affinity of the ICP grafted with the electrolyte located "above" and/or "below the pores" i.e. between the end of the CNTs and the electrode(s) in an electrochemical device integrating the membrane.

For example this gives the possibility of having a good affinity of the grafted ICP with an ionic liquid contained in the electrolyte. It is generally sufficient to graft the ICP only on one of the faces of the membrane, at the end of the nanotubes located on a same face of the membrane.

When the membrane with an electrolyte, for example with a polymeric electrolyte, according to the invention is used in an electrochemical device, such as a lithium battery, comprising in addition to the membrane with an electrolyte, a positive electrode, and a negative electrode, the ICP, with a nanometric thickness, will prevent direct contact with one of the electrodes while guaranteeing good ion conduction.

The very small thickness of the ICP will have a negligible impact on the overall ion conductivity.

On the other hand, the carbon nanotubes, since they are electronically conducting may be used as an electrode.

However for increasing their performances, the carbon nanotubes may there also be functionalized, on their outer wall, for example with redox species such as a nthraquinones, and/or electroactive species, such as ferrocene-pyrene.

Advantageously, the carbon nanotubes have an inner diameter from 1 to 100 nm, preferably from 1 to 20 nm, still preferably from 1 to 3 nm.

By substantially parallel, in the sense of the invention, is generally understood that the carbon nanotubes, and the pores or channels, have a mosaicity in orientation which does not exceed 10%.

Advantageously, the carbon nanotubes and the pores or channels have a length, which generally corresponds to the thickness of the membrane, from 10 microns to 100 mm, preferably from 50 microns to 500 microns, for example 150 microns.

Advantageously, the carbon nanotubes, and the channels or pores are positioned according to a regular pattern, for example in rows or according to a matrix, for example according to a compact hexagonal matrix.

More specifically when the membrane is observed, these are the ends, orifices opening out from these carbon nanotubes and channels or pores, for example at each of the first main surface and of the second main surface which are positioned according to a regular pattern on the first main surface and/or the second main surface (see FIG. 1).

Advantageously, the carbon nanotubes are separated by a distance of the order of magnitude of the external diameter $d_{ext}$, of the carbon nanotubes, for example by a distance from 1 to 100 nm, preferably from 1 to 20 nm, still preferably from 1 to 3 nm.

Let us specify that $d_{ext}$, the external diameter of a multi-walled carbon nanotube with an inner diameter $d_{int}$ having n walls is $d_{ext}=d_{int}+2\times n\times 0.34$ nm.

The solid material is notably selected according to the targeted use of the membrane with an electrolyte.

Thus, the solid material may be selected from electronically insulating materials or from electronically conducting materials for which the outer surface, in contact with the outside of the membrane, has been made electronically insulating.

Advantageously, the solid material may be selected from organic polymers like polystyrene; metals, and metal oxides.

The electrolyte may for example be a proton carrier or proton conductor such as a protonic ionic liquid or a protonic conducting polymer such as Nafion®, a zwitterionic ionic liquid, an acid dissolved in an organic polymer, a (pure) ionic liquid, an ionic liquid containing an ionic conducting salt such as a salt of an alkaline metal or a salt of an earth-alkaline metal, a liquid organic solvent or an organic polymer containing an ionic conducting salt such as an alkaline or earth-alkaline metal salt, an ionic liquid in an organic polymer, a mixture of an organic polymer and of an organic solvent, a mixture of an ionic liquid and of an organic solvent, a mixture of an ionic liquid, of an organic solvent and of a salt of an alkaline or earth-alkaline metal, a mixture of an organic polymer, of an organic solvent and of an alkaline or earth-alkaline metal salt, a mixture of a salt of an alkaline or earth-alkaline metal, for example lithium in a protonic ionic liquid; or further a combination of several of the electrolytes which have just been listed.

Advantageously, the electrolyte is non-aqueous, it is without any water, water-free.

It should be noted that generally the electrolyte contains an ionic conducting salt, except for example if the electrolyte comprises a protonic ionic liquid.

The ionic liquids, the protonic ionic liquids, and the zwitterionic ionic liquids refer to three families of different compounds.

Ionic liquids may generally be defined as liquid salts comprising a cation and an anion. The ionic liquids are thus generally composed of an organic cation, giving them a positive charge, with which is associated an anion which gives them a negative charge. Further, the ionic liquids are, as indicated by their name, generally liquids in the temperature range 0° C. to 200° C., in particular from 0° C. to 100° C., notably around room temperature, and they are thus often designated as "RTIL" (or "room temperature ionic liquids").

The diversity of the ionic liquids is great.

Thus, the cation $C^+$ of the ionic liquid may be selected from among the hydroxonium, oxonium, ammonium, amidinium, phosphonium, uranium, thiouronium, guanidinium, sulfonium, phospholium, phosphorolium, iodonium, carbonium cations; and the heterocyclic cations such as pyridinium, quinolinium, isoquinolinium, imidazolium, pyrazolium, imidazolinium, triazolium, pyridazinium, pyrimidinium, pyrrolidinium, thiazolium, oxazolium, pyrazinium, piperazinium, piperidinium, pyrrolium, pyrizinium, indolium, quinoxalinium, thiomorpholinium, morpholinium, and indolinium cations; and the tautomeric forms of the latter.

The anion of the ionic liquid may be selected from among halides such as Cl—, from among more complex anions such as $BF_4^-$, $B(CN)_4^-$, $CH_3BF_3^-$, $CH_2CHBF_3^-$, $CF_3BF_3^-$, $m-C_nF_{2n+1}BF_3^-$ wherein n is an integer such that $1 \leq n \leq 10$, $PF_6^-$, $CF_3CO_2^-$, $CF_3SO_3^-$, $N(SO_2CF_3)_2^-$, $N(COCF_3)(SOCF_3)^-$, $N(CN)_2^-$, $C(CN)_3^-$, $SCN^-$, $SeCN^-$, $CuCl_2^-$, $AlCl_4^-$, $AsF_6^-$, $ClO_4^-$, $B^-OB^-$, $ODBF^-$, $B(C_6H_5)^-$, $R_FSO_3^-$, $N(C_2F_5SO_2)_2^-$, $C(R_FSO_2)_3^-$ wherein $R_F$ is selected from among a fluorine atom and a perfluoroalkyl group comprising from 1 to 9, preferably from 1 to 8 carbon atoms, notably a group $—(CF_2)_nCF_3$ wherein n is an integer from 1 to 8, TFSI is the acronym of bis(trifluoromethylsulfonyl)imide, BOB that of bis(oxalato)borate, and BETI that of bis(perfluoroethylsulfonyl)imide.

Examples of ionic liquids are given in document FR-A-2 935 547 to which the description may refer to.

Thus the electrolyte may comprise, or may consist of, an ionic liquid or a mixture of ionic liquids.

Examples of such electrolytes are an electrolyte consisting of BMIMTFSI (1-butyl-3-methylimidazolium bis(trifluoromethylsulfonyl imide); or an electrolyte consisting of 1-octyl-3-methylimidazolium tetrafluoroborate ($OMIMBF_4$).

The electrolyte may comprise or consist of, at least one organic polymer.

The organic polymer may notably be selected from among crystalline or semi-crystalline organic polymers before confinement in the carbon nanotubes.

By crystalline or semi-crystalline organic polymer (before confinement), is generally meant that said organic polymer is crystalline or semi-crystalline for any temperature below 100° C., and notably at room temperature.

But the organic polymer may also be selected from among liquid or amorphous polymers (before confinement) or further from among cross-linked polymers. The liquid or amorphous polymers at a temperature of less than 100° C., for example at room temperature, are preferably selected from among polymers, notably oligomers, of PEO, and their derivatives.

When the electrolyte comprises an organic polymer whether it is crystalline, semi-crystalline, liquid or amorphous, the electrolyte generally further comprises an ion conducting salt, and the electrolyte is then generally called a polymeric electrolyte or electrolyte polymer.

Preferably, the electrolyte then consists of an organic polymer which is crystalline, semi-crystalline, liquid or amorphous, and further generally of an ionic conducting salt. The electrolyte before it is confined, before confinement, in the carbon nanotubes, is also called a non-confined electrolyte, an electrolyte before confinement, and is often designated by the name of electrolyte "in volume" or "bulk" electrolyte.

Thus, if the electrolyte comprises or consists of an organic polymer, the polymer, before it is confined, also called a non-confined polymer is often designated by the name of polymer "in volume" or "bulk" polymer.

By polymer in the sense of the invention, are meant both homopolymers and copolymers and oligomers.

Advantageously, the organic polymer whether it is semi-crystalline or crystalline, or liquid or amorphous, is selected from among polymers which have good solvation of the ions of alkaline metals, such as Li, or of the ions of earth-alkaline metals.

Advantageously, the organic polymer notably semi-crystalline or crystalline is selected from among homopolymers and copolymers of ethylene oxide and their derivatives.

The homopolymers and copolymers of ethylene oxide and their derivatives, either semi-crystalline or crystalline generally have a crystallinity of at least 10%.

Advantageously, the organic polymer has a molar mass of less than $10^6$ g/mol, preferably less than $10^5$ g/mol.

It is obvious that the molar mass of the organic polymer is at least equal to the molar mass of the monomer(s) used for preparing it.

This molar mass is for example from $10^5$ to 44 g/mol in the case of PEO.

There this is one of the additional advantages of the membrane according to the invention of allowing the use in the electrolyte of polymers of smaller molar mass, and therefore less viscous, more fluid than the polymers used up till now in electrolytes.

Indeed, in the membrane according to the invention, an excellent confinement of the polymer of the electrolyte is obtained in the channels, pores defined by the nanotubes, and this even for polymers of lower molar mass, and therefore less viscous, more fluid. Therefore no dispersion of the electrolyte occurs in the environment during an incident even if the polymer of the electrolyte is a polymer of low molar mass, «which flows», since the electrolyte does not leave the channels, pores and does not escape therefrom.

In the membranes of the prior art, the confinement of the electrolyte in the pores being less well insured, it is necessary to use a polymer of a high molar mass, viscous which does not flow, so that it does not escape and does not disperse into the environment during an incident.

Still advantageously, the organic polymer has a molar mass of less than its critical entanglement mass.

The critical entanglement mass is generally defined as the mass from which the dynamics of the polymer is located in crawling conditions.

For example, the critical entanglement mass of the PEO is 3,600 g/mol.

Advantageously, the polymer is selected from poly(ethylene oxides) of a molecular mass of less than 3,600 g/mol, preferably from 44 (mass of the monomer) to 2,000 g/mol.

The ionic conducting salt may be a salt of an alkaline metal or a salt of an earth-alkaline metal.

The salt of an alkaline metal may for example be a lithium salt or a sodium salt, and the salt of the earth-alkaline metal may for example be a magnesium salt.

The lithium salt may be selected for example from among $LiAsF_6$, $LiClO_4$, $LiBF_4$, $LiPF_6$, LiBOB, LiODBF, $LiB(C_6H_5)$, $LiR_FSO_3$ for example $LiCF_3SO_3$, $LiCH_3SO_3$, $LiN(R_FSO_2)_2$ for example $LiN(CF_3SO_2)_2$ (LiTFSI) or $LiN(C_2F_5SO_2)_2$ (LiBETI), $LiC(R_FSO_2)_3$, for example $LiC(CF_3SO_2)_3$ (LiTFSM), wherein $R_F$ is selected from among a fluorine atom and a perfluoroalkyl group comprising from 1 to 9 carbon atoms, preferably from 1 to 8 carbon atoms, LiTFSI is the acronym of lithium bis(trifluoromethylsulfonyl)imide, LiBOB that of lithium bis(oxalato)borate, and LiBETI that of lithium bis(perfluoroethylsulfonyl)imide.

The sodium salt may be selected from among salts analogous to the already listed lithium salts above but comprising a sodium ion instead of a lithium ion.

Advantageously, the concentration of ionic conducting salt such as a salt of an alkaline metal or a salt of an earth-alkaline metal, when it is present in the electrolyte, and in particular in the polymeric electrolyte, may be from 1 to 50% by mass based on the mass of the electrolyte, for example of the polymeric electrolyte.

Advantageously, the electrolyte is a polymeric electrolyte which comprises, preferably consists of, a poly(ethylene oxide) (PEO), preferably a semi-crystalline poly(ethylene oxide) (before confinement) and a lithium salt, preferably LiTFSI.

Advantageously, the ratio of the lithium atoms to the oxygen atoms of the ether groups of the polyethylene glycol is less than or equal to 1/8, for example this ratio may be 1/8, 1/12 or 1/16.

Or else the electrolyte may comprise, preferably consist of, an organic solvent containing an ionic conducting salt.

Or else the electrolyte may comprise, preferably consist of, a proton conductor (carrier), for example a sulfonated polymer like Nafion®.

Advantageously, the electrolyte, such as a polymeric electrolyte totally fills the nanotubes and the pores or channels.

It should be noted that the electrolyte, such as a polymeric electrolyte does not appear as particles, notably as discrete nanoparticles but actually as a continuous and compact mass filling each of the carbon nanotubes, of the pores and in contact with the walls of the latter.

The membrane with an electrolyte according to the invention, for example with a polymeric electrolyte according to the invention, has never been described in the prior art as notably illustrated by document [1].

The membrane with an electrolyte, for example with a polymeric electrolyte according to the invention does not have the defects of the membranes with an electrolyte, for example membranes with a polymeric electrolyte of the prior art and provides a solution to the problems posed by membranes with an electrolyte, for example with a polymeric electrolyte, of the prior art.

The porous membrane with an electrolyte according to the invention has at least three essential characteristics, i.e. on the one hand the presence of pores with a nanometric section (defined by the carbon nanotubes), which confine an electrolyte, for example a polymeric electrolyte or an ionic liquid; next, the fact that these pores are through-pores substantially oriented in the same direction, or even oriented in the same direction, i.e. the direction of the thickness of the membrane and all substantially parallel, or even parallel; and finally the fact that the pores or channels are specifically pores defined by means of carbon nanotubes.

More specifically, the pores or channels are defined by the carbon nanotubes or more exactly by the internal, inner wall of the carbon nanotubes. In fact, these pores or channels have a smooth surface unlike the pores or channels which are not defined by carbon nanotubes such as for example channels or pores which are generated in a mineral substrate by chemical etching like in document [1].

By smooth surface, is generally meant that the surface does not have any irregularities (asperities, reliefs; etc.) on the subnanometric scale, that the surface does not cause chemical and/or physico-chemical interactions such as friction with the fluid confined in the channels.

The flow of the electrolyte in the channels defined by the carbon nanotubes of the membrane according to the invention occurs at a non-zero rate, speed, at the wall thanks to the absence of interactions between the fluid and the wall, and notably thanks to the absence of friction.

In document [1], the channels of the membrane are defined in a metal or metalloid oxide, and therefore there exist strong interactions between the electrolyte which is found in the channels, and the walls of the channels which are irregular and rough. These interactions are reduced or even suppressed in the channels of the membrane according to the invention defined by carbon nanotubes.

Further, as this was specified above, the channels should not be obstructed but the absence of obstruction in the channels should not be confused with the absence of interactions between the electrolyte and the wall.

The combination of these three characteristics, has never been described in the prior art and clearly differentiates the membrane with an electrolyte according to the invention from the membranes according to the prior art. In particular, a membrane with an electrolyte including pores defined by carbon nanotubes has never been described.

In other words according to the invention, an electrolyte is confined in a membrane having both nanometric porosity and macroscopic orientation which are specifically generated by carbon nanotubes.

The membrane with an electrolyte according to the invention attains the goals mentioned above and provides a solution to the problems indicated above.

It may be stated that the membrane with an electrolyte according to the invention utilizes the effect of a uni-dimensional nanometric confinement (1D) of an electrolyte within the membrane, more exactly in the pores or channels defined by the carbon nanotubes (FIG. 1) for increasing the conductivity of the electrolyte and for tripling, or even tenfold increase thereby the power of electrochemical devices for storing energy comprising said membrane.

The combination of the three characteristics listed above gives the membrane with an electrolyte according to the invention, for example with a polymeric electrolyte or an ionic liquid, advantageous and surprising properties notably as to its ionic conductivity in particular at room temperature.

Thus, by means of the membrane with an electrolyte according to the invention, a gain of a factor 3, or even of a factor 10 is obtained on the transport properties and therefore on the ionic conductivity.

As compared with a, "bulk" electrolyte, non-confined, we show here a gain by a factor 3 on the diffusion coefficient of an ionic liquid (see examples).

Consequently, the membrane with an electrolyte according to the invention gives the possibility of a significant gain in the power delivered by the accumulators, batteries, comprising it.

The membrane with an electrolyte according to the invention therefore contributes to filling the power/energy gap existing in the performances of low carbon energy storage systems.

It may be stated that the membrane with an electrolyte, for example with a polymeric or ionic liquid electrolyte according to the invention, because of the three essential aforementioned characteristics, gives the possibility of improving the performances of the electrolytes, and in particular of the polymeric or ionic liquid electrolytes at room temperature by means of the putting in conjunction, combination of at least three effects.

In other words, it may be considered that the improvement in the performances of the electrolyte and notably the gain in conductivity, finds its origin at a molecular scale, i.e. a few Angstroms, in the conjunction, combination of at least the three following effects:

i) the extreme confinement of molecules of electrolytes i.e. for example of ionic liquid, of polymer and optionally ionic salt, inside the channels or pores defined by the carbon nanotubes CNTs, in other words in the core of the CNTs, induces a frustration of the spontaneous organization which normally has the electrolyte when it is in a volume (bulk).

In the case of ionic liquids for example, the organization in self-organized transient clusters of a nanometric size is thwarted, counter-acted, constrained.

This confinement is due to the nanometric diameter of the nanotubes which generally have an internal diameter from 1 to 100 nm, preferably from 1 to 20 nm, still preferably from 1 to 3 nm.

It is believed that the increase in the diffusion coefficient and/or in ionic conductivity is inversely proportional to the diameter of the CNTs.

The maximum increase in the diffusion coefficient and/or in the ionic conductivity is obtained by using CNTs for which the diameter is in the range from 1 to 3 nm.

The confinement of the electrolytes according to the invention gives the possibility of obtaining substantial modifications of the thermodynamic behavior relatively to the situation in a volume («bulk»).

For example it is possible to induce by nanometric confinement a significant shift (several tens of degrees) of the melting point of a crystalline/semi-crystalline system.

An essential point is that these thermodynamic aspects are only the expression of underlying structural modifications induced by the confinement.

These are these structural changes at a molecular scale which induce in turn specific dynamic properties, like the super-mobility of the electrolyte which is obtained according to the invention.

ii) the incommensurability of the structure of the molecules of the electrolyte with the «smooth» inner surface of the CNTs induces a slipping phenomenon on this wall, since the friction coefficient at the CNT/electrolyte interface is zero.

iii) the macroscopic orientation of the pores of CNTs imposes a preferred direction, and without any tortuosity, of the transport of the electrolyte from one electrode to the other.

Further, in the membrane with an electrolyte according to the invention, there is a transfer to the membrane of the mechanical strength stress of the electrolyte, which gives the possibility of using liquid electrolytes or of low molecular weight, for example oligomers, and therefore improving significantly the conductivity of the electrolyte.

Further, nanoconfinement, generally defined by a diameter of the CNTs and of the pores of the membrane which confine the electrolyte lower from 100 nm, for example from 10-50 nm, gives the possibility, notably in the case of polymeric electrolytes, of reducing the melting point of the polymer by the Gibbs-Thomson effect, so that the melting of the polymer occurs preferably at room temperature.

More generally, in the case of the compounds of the electrolyte which include a crystalline fraction, in other words crystalline or semi-crystalline compounds, nanoconfinement has the effect of reducing, or even totally suppressing the crystalline fraction which this compound includes before its incorporation into the pores or channels of the membrane, and of thereby increasing conductivity.

It may be stated that nanoconfinement leads to partial or total amorphization of the compound and to a system having greater mobility.

In the case of a semi-crystalline polymer, such as PEO, nanoconfinement will lead to partial amorphization and advantageously to a reduction in the melting temperature of the polymer.

In the liquid state, beyond its melting point, the polymer is generally 10 to 100,000 times less viscous than below its melting point.

The unidimensional conduction in pores with low tortuosity ensures that the transport properties of the electrolytes from one electrode to the other are not affected in the membrane with an electrolyte according to the invention.

In the case when the compound is already liquid or amorphous at a temperature of less than 100° C., and notably at room temperature, it is this unidirectional aspect 1D which is preponderant relatively to the nanoconfinement aspect.

As a conclusion, relatively to the electrolytes, and in particular to the polymeric or ionic liquid electrolytes of the prior art, the advantages provided by the membrane with an electrolyte according to the invention are essentially the performances, the safety and the economic viability.

As regards the performances, the membrane according to the invention has the advantages of having an operating temperature generally around room temperature and of having a quasi-unidimensional conduction with increased conductivity.

As regards safety, the membrane with an electrolyte according to the invention has the advantages of ensuring a confinement of the electrolyte and of avoiding a dissemination of the electrolyte in the environment in the case of failure of the accumulator, battery—which is particularly advantageous in the case of liquid electrolytes—and of limiting the dendritic growth phenomenon and therefore the risks of spontaneous inflammation of the accumulator.

As regards economic viability, the membrane with an electrolyte according to the invention has the advantage of giving the possibility of a reduction in the amount of conductive salt optionally including in the composition of the electrolyte, in particular of the lithium salt, used, which accordingly causes a reduction in the cost of the electrolyte and of the accumulator containing it. Further, the dendritic growth phenomenon and the related risks are limited, the membrane with an electrolyte, for example a polymeric electrolyte according to the invention, may see its applications extended to portable and/or «public» electronics.

The invention further relates to a method for preparing the porous membrane with an electrolyte according to the invention, as this was described in the foregoing, wherein, the following successive steps a) and b) are achieved:

a) carbon nanotubes, all substantially parallel, and separated by a space, are grown on a surface of a substrate provided with a growth catalyst of the carbon nanotubes;

b) said space between the carbon nanotubes is totally filled with a solid material;

or else the following step a1) is carried out:

a1) carbon nanotubes, all substantially parallel, and separated, are grown on a surface of a substrate and inside the pores of a porous solid material with oriented pores; and then, at the end of step b) or of step a1), the following step c) is carried out:

c) the substrate, any possible solid material in excess are removed, and both ends of the carbon nanotubes are opened;

and then, at the end of step c), the following step d) is carried out:

d) the inside of the nanotubes is filled with an electrolyte.

It may be stated that during the step a), a forest of carbon nanotubes or a carpet of carbon nanotubes are grown on the substrate.

Advantageously, the growth substrate may be a silicon wafer, or a sheet of stainless steel or of aluminium on which is deposited an alumina layer, and the growth catalyst of the carbon nanotubes is deposited on the alumina layer.

Advantageously, the growth catalyst of the carbon nanotubes may be selected from among iron, nickel, cobalt, and their alloys.

Advantageously, the carbon nanotubes may be grown by a chemical vapor deposition method (CVD).

The solid material may be an organic polymer, and then step b) is achieved:

either by dissolving the organic polymer in a solvent in order to form a solution of the organic polymer, by totally filling the space between the carbon nanotubes with the solution of the organic polymer and by evaporating the solvent.

or by heating the organic polymer in the absence of any solvent above its glass transition temperature (Tg) or its melting point for making it fluid, and by leaving the fluid polymer be absorbed in the space between the carbon nanotubes.

or by filling the space between the carbon nanotubes with a mixture comprising organic monomers (such as styrene, methyl methacrylate, or other), or organic oligomers modified by reactive functions, or organic copolymers, and further one or several photosensitive and/or thermosensitive free radicals initiator(s);

and then by cross-linking said mixture thermally or by means of a photon radiation.

Or else, the solid material may be a metal, and then step b) is carried out by depositing said metal with an electrochemical deposition method in the space between the carbon nanotubes.

Or else, the solid material may be a metal oxide and then step b) is carried out by depositing said metal oxide by an electrochemical deposition method, or with a sol-gel method, in the space between the carbon nanotubes.

Regardless of the solid material, step b) may also be carried out by projecting in vacuo said solid material in the space between the carbon nanotubes (vacuum spraying).

In order to fill the inter-pore space of the CNTs and to achieve a membrane, a metal of interest would no doubt be aluminium which is lightweight and quite ductile.

It may be deposited by electrodeposition and then (in the case when the membrane is intended to be used as a separator) achieving a simple short anodization for transforming the external surfaces into alumina, which as for it is an insulating material. Thus, finally, inside the membrane, there is then metal but the outer surfaces of the membrane in contact with the electrodes are insulating surfaces.

Advantageously, the step c) may be carried out by mechanical polishing and/or by plasma etching.

The invention further relates to an electrochemical device comprising a membrane with an electrolyte according to the invention, for example with a polymeric electrolyte as described above.

In particular, the invention relates to a lithium battery accumulator comprising a membrane with an electrolyte according to the invention, as described above, a positive electrode and a negative electrode (FIGS. 2, 3 and 4).

This lithium battery, accumulator may be an Li-Metal battery, accumulator in which the negative electrode is made of Lithium metal or else this lithium battery, accumulator may be a Lithium-ion battery, accumulator.

Such a device has all the advantages inherently related to the application in such devices of the membrane with an electrolyte according to the invention.

The invention will now be described in a more specific way in the description which follows, given as an illustration and not as a limitation with reference to the appended drawings.

SHORT DESCRIPTION OF THE DRAWINGS

Figure 5:
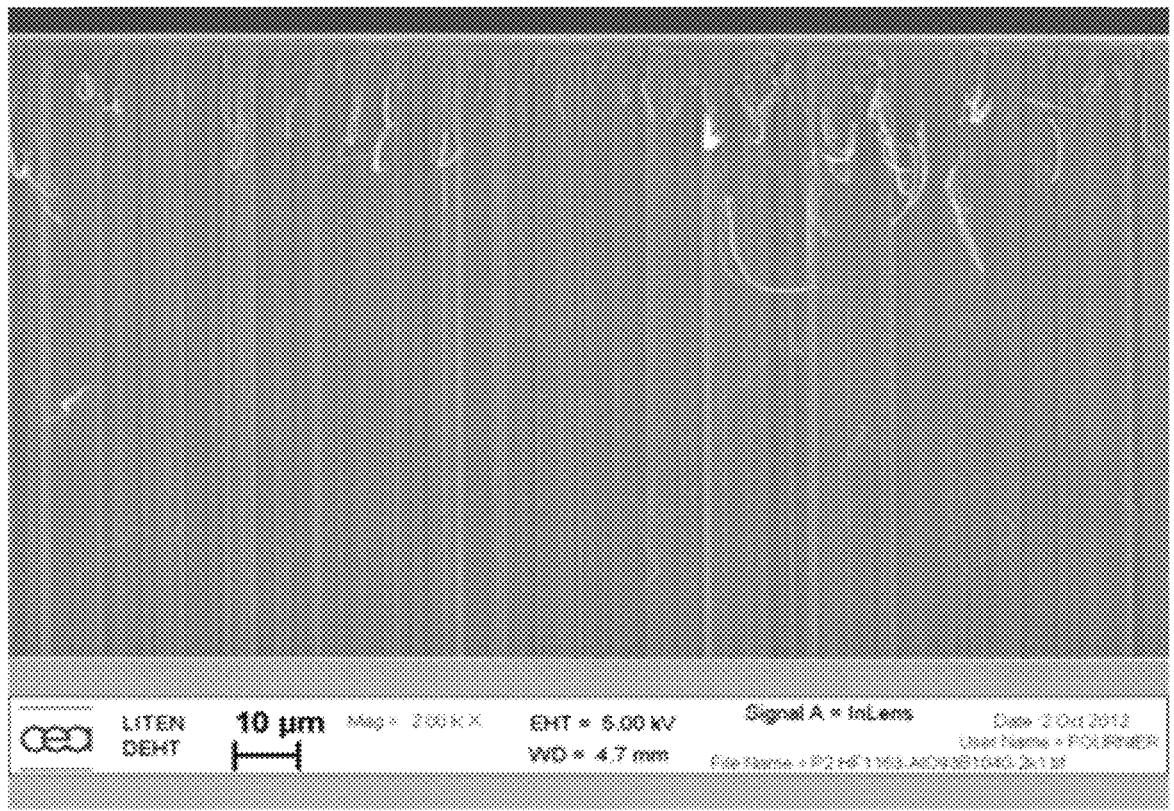
FIG. 5 is a photograph taken with a scanning electron microscope of the carpet or forest of carbon nanotubes obtained at the end of step 1 of Example 1.

The scale plotted in FIG. 5 represents 10 μm.

Figure 6:
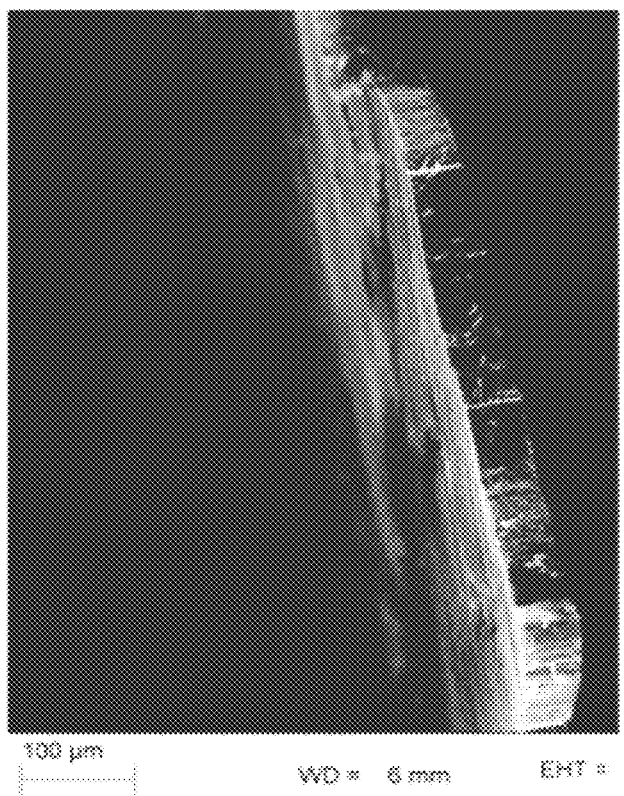

FIG. 6 is a photograph taken with a scanning electron microscope of the membrane obtained at the end of step 3 of Example 1.

The scale plotted in FIG. 6 represents 100 μm.

Figure 7:
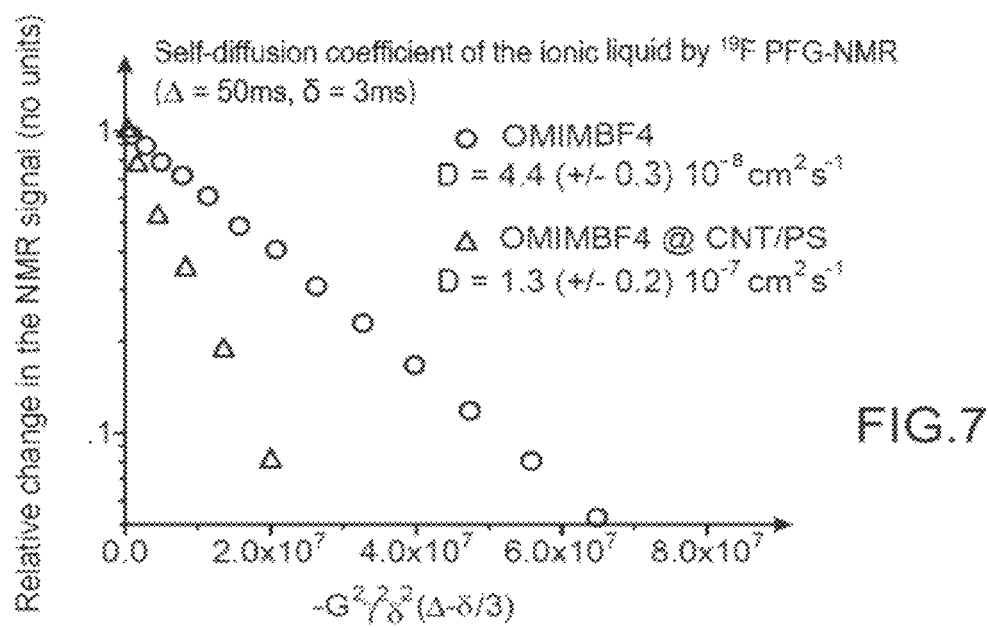

FIG. 7 is a graph which gives, at room temperature, the self-diffusion coefficient measured by $^{19}F$ NMR with a field gradient, of the ionic liquid confined in the pores of the CNTs membrane of Example 1, i.e. 1-octyl-3-methylimidazolium tetrafluoroborate, ($OMIMBF_4$) (Δ points); and the self-diffusion coefficient of this same ionic liquid, i.e. 1-octyl-3-methylimidazolium tetrafluoroborate, ($OMIMBF_4$), but not confined in the pores of the membrane (o points). This non-confined ionic liquid is also called a «volume» ionic liquid or a «bulk» ionic liquid.

In abscissas, is plotted the diffusion function $(-G^2\gamma^2\delta^2(\Delta-\delta/3))$ in $s/cm^2$ (second/centimeter$^2$), wherein G is the pulsed field gradient, γ is the gyromagnetic ratio of the studied nucleus—here fluorine-19-δ the duration of the gradient pulse, and Δ the diffusion time (in this experiment, we used a sequence of the stimulated gradient type with δ=3 ms, Δ=50 ms and G varying from 5 G/cm to 700 G/cm).

In ordinates is plotted the relative change of the NMR signal (without any unit).

Figure 8:
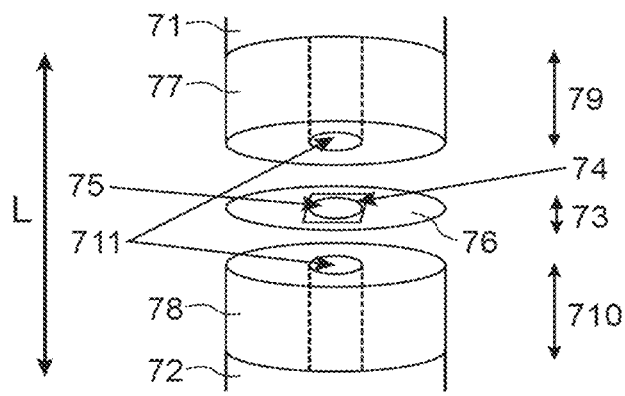

FIG. 8 is a schematic layout of the device which gave the possibility of measuring by impedance spectroscopy, at room temperature, the conductivity of the ionic liquid confined in the pores of the CNTs membrane of Example 1, i.e. 1-octyl-3-methylimidazolium tetrafluoroborate, ($OMIMBF_4$); and the conductivity of this same ionic liquid, i.e. 1-octyl-3-methylimidazolium tetrafluoroborate, ($OMIMBF_4$), but not confined in the pores of the membrane.

Figure 9:
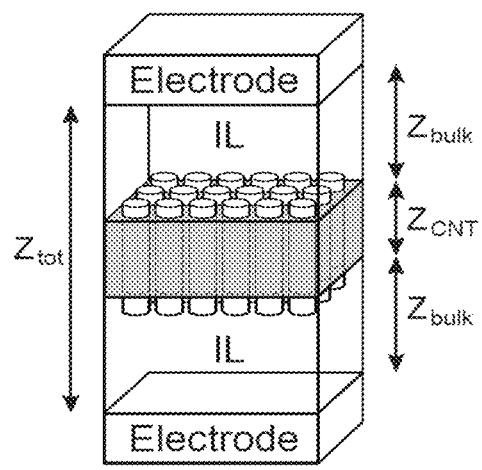

FIG. 9 is a simplified schematic layout of the device of FIG. 8.

Figure 10:
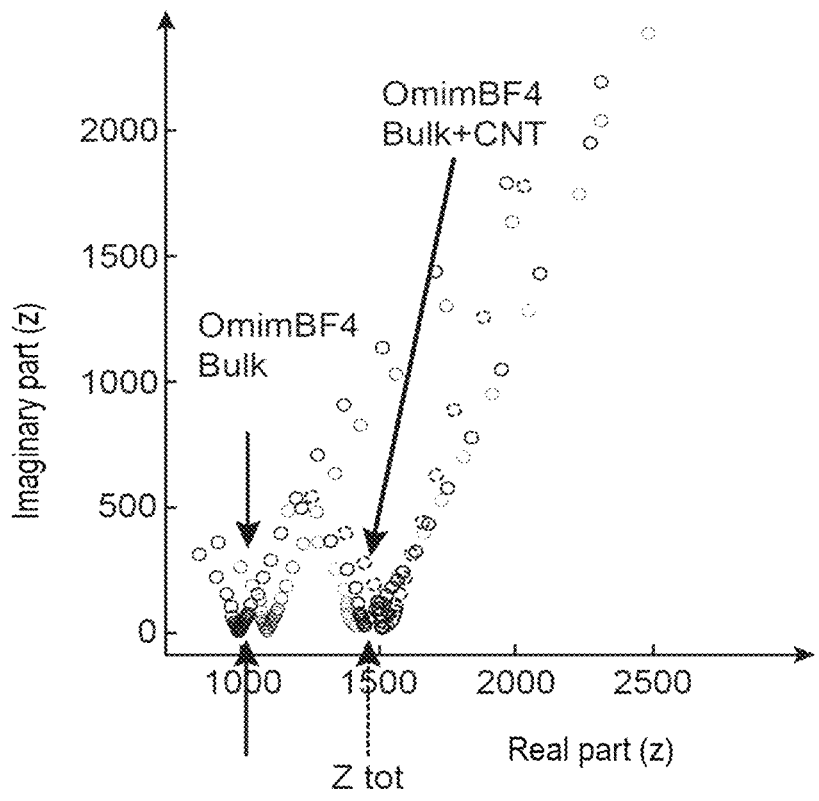

FIG. 10 is a graph which gives the electric impedance of the ionic liquid confined in the pores of the CNTs membrane of Example 1, i.e. 1-octyl-3-methylimidazolium tetrafluoroborate, ($OMIMBF_4$) («$OmimBF_4$ Bulk+CNT»); and the impedance of this same ionic liquid, i.e. 1-octyl-3-methylimidazolium tetrafluoroborate, ($OMIMBF_4$), but not confined in the pores of the membrane («$OmimBF_4$ Bulk»).

In ordinates, is plotted the imaginary part of the electric impedance (in Ohms), and in abscissas is plotted the real part of the electric impedance (in Ohms).

DETAILED DISCUSSION OF PARTICULAR EMBODIMENTS

This description more particularly refers to an embodiment in which the porous membrane with an electrolyte according to the invention is a membrane with an ionic liquid electrolyte, notably the membrane with an electrolyte of a lithium battery, accumulator, but it is quite obvious that the following description may easily be extended, if required, to any membrane with an electrolyte which may be applied in any electrochemical device or system, regardless of the electrolyte.

Further, the description which follows is rather accomplished by convenience in connection with the method for preparing the membrane according to the invention but it also contains teachings which relate to the membrane prepared by this method.

Figure 1A:
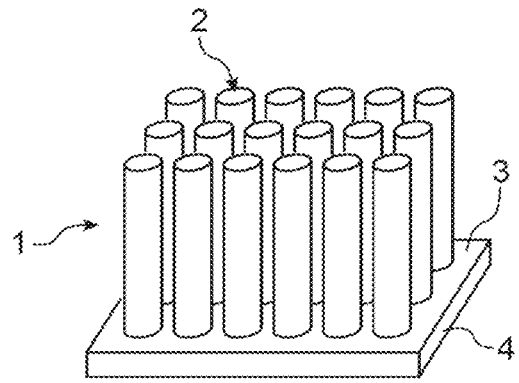
FIG. 1 is a schematic illustration of the steps a) (FIG. 1A), b) (FIG. 1B) and c) (FIG. 1C) of the method according to the invention during which a carpet or a forest of carbon nanotubes (FIG. 1A) is transformed into a membrane of carbon nanotubes (FIG. 1C).

In order to prepare the membrane according to the invention, it is possible to begin by preparing, synthesizing, a carpet of carbon nanotubes, which may also be described as a forest of carbon nanotubes, on a surface (3) of a solid substrate (4) (FIG. 1A).

Figure 1B:
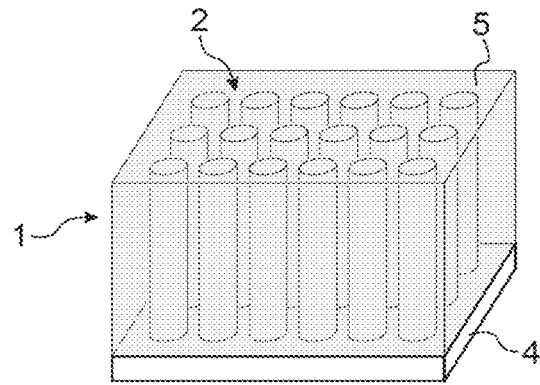
Figure 1C:
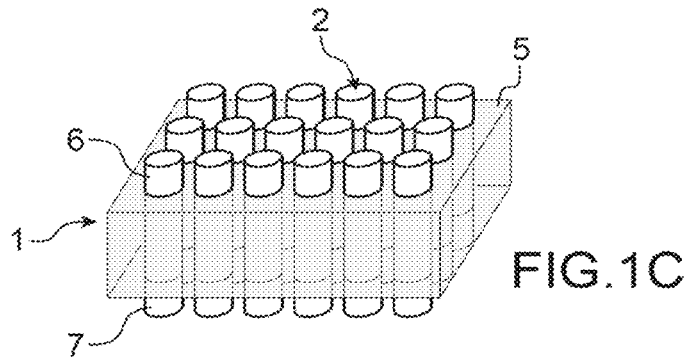

From this carpet, or forest, a membrane is then obtained by bridging, filling the inter-tube space and by opening the carbon nanotubes on each side of the membrane (see FIG. 1B and FIG. 1C).

The carpet of CNTs (1) may be synthesized with a chemical vapor deposition method CVD.

According to a first embodiment, a carpet (1) of multi-walled nanotubes (2) may be synthesized on a surface (3) of a solid substrate (4).

In this case, the growth substrate is a silicon wafer on which is deposited by an ALD («Atomic Layer Deposition») method an alumina layer generally with a thickness of 20 nm.

According to an alternative, this alumina layer may be deposited on the substrate by cathode sputtering, or by an Ion Beam Sputtering or IBS method.

On this substrate, a catalyst is deposited, this catalyst may for example be iron, nickel, cobalt, or an alloy of these metals.

This catalyst generally appears as a layer for example with a thickness from 0.2 to 2 nm.

In this embodiment where a carpet of small multi-walled nanotubes (i.e. with a diameter from 3 to 5 nm) is synthesized, an iron layer with a thickness of 1 nm is deposited by evaporation with an electron gun.

This substrate just before the growth of the nanotubes may optionally be treated with a plasma.

However, this treatment with a plasma is not mandatory and may be omitted.

For example, this substrate may be treated by means of a succession of two air plasmas generally at the pressure of 0.3 mbar. This treatment has the goal of suppressing the parasitic carbon of the sample and of oxidizing the catalyst.

The first plasma may be a plasma with a period of 20 minutes with a power of 80 W, the second plasma may be a plasma with a period of 20 minutes with a power of 30 W.

The substrate is then introduced into a chemical vapor deposition CVD enclosure.

This deposition enclosure may, in this embodiment where a carpet of small (i.e. with a diameter from 3 to 5 nm) multi-wall nanotubes is synthesized, including a network of 10 filaments mounted in parallel.

The filaments are for example located at 1 cm from the sample holder (sole) and spaced apart by 1 cm.

The gas mixture, consisting for example of 20 sccm of acetylene, 50 sccm of hydrogen and 110 sccm of helium, is introduced under cold conditions at a pressure for example of 0.9 mbar.

The sole is brought to the temperature of 400° C. in 10 minutes and then a plateau is observed at this temperature. The filaments are heated by the joule effect with a power for example of 800 W.

Under these conditions after a plateau of 20 minutes at the temperature of 400° C., a carpet of nanotubes is obtained for which the average diameter is 4.5 nm and the height is 200 μm.

If the plateau is brought to 45 minutes, carpets with a height of 400 μm are obtained.

The density of the nanotubes on the substrate is generally greater than $10^{11}$ cm$^{-2}$. According to a second embodiment, a carpet (1) of single-walled carbon nanotubes (2) may be synthesized on a surface (3) of a solid substrate (4).

In this case relatively to the first embodiment of the synthesis of the carpet of nanotubes:
the thickness of the catalyst layer like iron is reduced to 0.25 nm,
the temperature of the heating sole is brought to 500° C.,
the number of filaments is reduced to 6,
the gas mixture consists of 5 sccm of acetylene, 200 sccm of hydrogen, and 200 sccm of helium.

The other conditions of the synthesis of the carpet of nanotubes are identical with those of the first embodiment of this synthesis.

During this step for synthesizing the carpet of carbon nanotubes CNTs, the man skilled in the art may easily adapt the conditions of the method so as to obtain single-walled or multi-walled carbon nanotubes having the diameter, the grafting density of the CNTs, and the desired length of the CNTs, within wide ranges.

Thus:
Diameter of the pores: CNTs may be obtained for which the diameter is found in the range from 1 to 100 nm, it is believed that the increase in the diffusion coefficient and/or in the ionic conductivity is inversely proportional to the diameter of the CNTs. Preferably it is sought to obtain CNTs for which the diameter is in the range from 1 to 3 nm.
Grafting density of the CNTs: It is possible to obtain a grafting density from $10^9$ to $10^{13}$ cm$^{-2}$.

It will generally be sought to optimize the grafting density of the CNTs, so that it is as high as possible, for example in the range from $10^{11}$ cm$^{-2}$ to $10^{13}$ cm$^{-2}$.
Length of the CNTs: It is possible to obtain CNTs with a length in the range from 10 microns to 100 mm, preferably from 50 microns to 500 microns, for example 150 microns.

After having synthesized the carpet (1) of carbon nanotubes (2), on a surface (3) of a solid substrate (4), this carpet is transformed into a membrane by bridging/filling/filling up the space between the carbon nanotubes, CNTs, with a solid material such as an organic polymer also called a matrix material (5) (FIG. 1B).

In the case when the solid material is an organic polymer, this polymer may be dissolved in an adequate solvent for obtaining a solution of the organic polymer in the solvent.

The polymer such as the polystyrene of 350,000 g/mol may for example be dissolved in toluene for obtaining a solution at 20% by mass.

The solution of the organic polymer is poured on the carpet of CNTs, in return for which it fills the space between the carbon nanotubes, and then the solvent is left to evaporate.

Or else, it is possible to use an organic polymer without any solvent and to heat it, preferably in vacuo, above its glass transition temperature Tg, or above its melting point, for thus obtaining a fluid or molten polymer. This fluid or molten polymer may be left to be absorbed in the intertube space by simple capillarity.

If the solid material is a metal or metal oxide, said metal or said metal oxide may then be deposited by one of the methods already mentioned above, such as an electrochemical deposition method or a sol-gel method, in the space between the carbon nanotubes.

Regardless of the solid material, the space between the carbon nanotubes may be filled by projecting said solid material in the space between the carbon nanotubes.

According to another embodiment, instead of growing carbon nanotubes, all substantially parallel and separated by a space, on a surface of a substrate provided with a growth catalyst of the carbon nanotubes, and then totally filling said space between the carbon nanotubes with a solid material, it is possible in a single step to grow carbon nanotubes, all substantially parallel and separated, on a surface of a substrate and inside the pores of a porous solid material with oriented pores.

Such a porous solid material with oriented pores may for example be selected from among porous aluminas, and the growth may be achieved with a chemical vapor phase deposition method CVD.

Next, the substrate is removed, any optional solid material in excess is removed, and both ends (6, 7) of the carbon nanotubes (2) (FIG. 1C) are opened.

The optional solid material in excess is essentially the solid material in excess which covers the end (6) of the carbon nanotubes on the side opposite to the substrate.

The removal of the substrate, of the optional solid material in excess, and the opening of both ends of the carbon nanotubes may be achieved with any adequate technique for example by mechanical polishing and/or by plasma etching.

Next, in a final step (not illustrated in FIG. 1), the inside of the nanotubes is filled with an electrolyte.

The electrolyte has already been described above.

As this was already indicated above, in the case when the electrolyte is a polymer which contains a conductive salt, this is then referred to as an electrolyte polymer or a polymeric electrolyte.

Any type of electrolyte polymer may be used for example a solution of an alkaline salt in poly(oxyethylene) (POE). The mass of the poly(oxyethylene)(POE) may be in the range between 44 and $10^6$ g/mol.

Ionic salts and ionic liquids have already been listed above.

The filling may be carried out by simple imbibition, either spontaneous or in vacuo, of the core, the inside of the CNTs in contact with the electrolyte, for example the ionic liquid.

In the case of a polymeric electrolyte, the latter may be confined in the pores by immersing it in an excess of molten or liquid polymeric electrolyte, preferably in vacuo and in hot conditions above the melting point of the electrolyte.

It may be stated that the liquid polymeric electrolyte penetrates the porous structure by simple capillarity.

Figure 2:
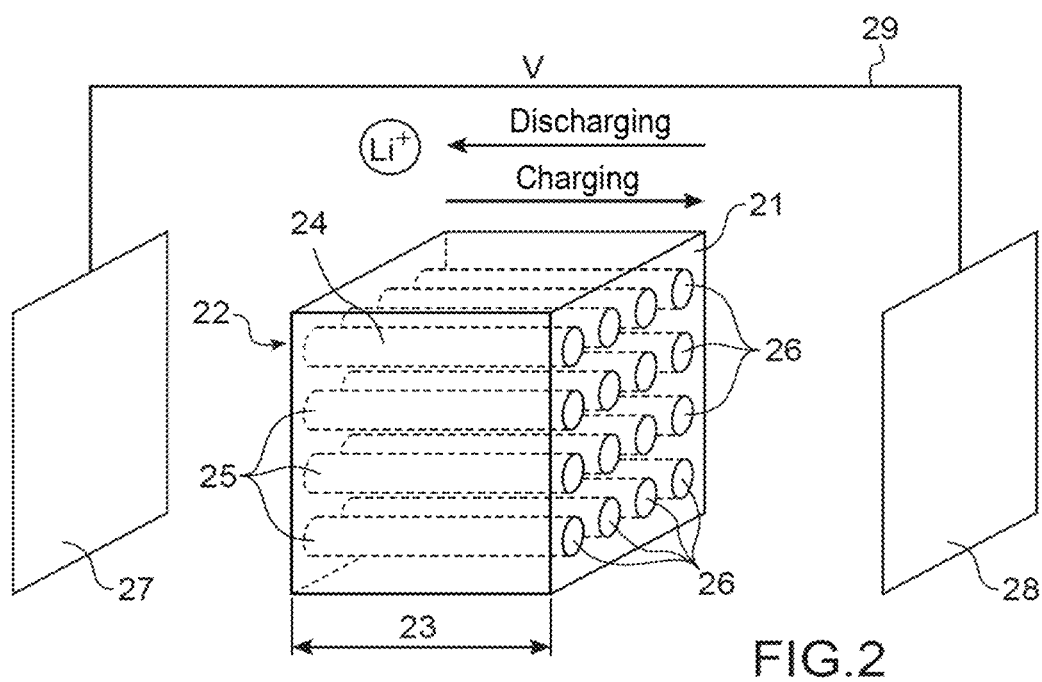
FIG. 2 is a schematic view of a battery, accumulator, such as a lithium battery, accumulator comprising the membrane with an electrolyte according to the invention.

The membrane with an electrolyte, for example with an ionic liquid or with a polymer, according to the invention such as has been described above may be used in any electrochemical system applying a polymeric electrolyte (FIG. 2).

The membrane with an electrolyte comprises a first main surface (21) and a second main surface (22) separated by a thickness (23).

Carbon nanotubes define through-pores or channels (24) open at both of their ends (25, 26), with a diameter of less than or equal to 100 nm, oriented in the sense of the thickness (23) of the membrane and all substantially parallel, on the totality of the thickness (23) of the membrane. These pores or channels connect the first main surface (21) and the second main surface (22); and an electrolyte is confined in the pores (24) of the membrane.

The electrochemical system may notably be a rechargeable electrochemical accumulator such as a lithium accumulator or battery, which in addition to the membrane with an electrolyte, as defined above comprises a positive electrode; a negative electrode; generally current collectors (27,28), generally made of copper for the negative electrode, or made of aluminium for the positive electrode, which allows circulation of the electrons, and therefore electron conduction, in the outer circuit (29); and generally a separator giving the possibility of preventing the contact between the electrodes and therefore the short-circuits, these separators may be microporous polymeric membranes. The negative electrode may consist of lithium metal as an electrochemically active material, in the case of lithium-metal accumulators, batteries, otherwise the negative electrode may comprise as an electrochemically active material, insertion materials such as graphite carbon ($C_{gr}$), or lithiated titanium oxide ($Li_4Ti_5O_{12}$) in the case of accumulators, batteries, based on the lithium-ion technology.

The positive electrode generally comprises, as an electrochemically active material, lithium insertion such as lamellar oxides of lithiated transition metals, olivins or lithiated iron phosphates ($LiFePO_4$) or spinels (for example, the spinel $LiNi_{0.5}Mn_{1.5}O_4$).

More specifically, the electrodes, in the case when they do not consist of lithium metal, comprise a binder which is generally an organic polymer, an electrochemically active material of a positive or negative electrode, optionally one or electron conductive additive(s), and a current collector.

In the positive electrode, the electrochemically active material may be selected from among the compounds already mentioned above in the present description; and from among $LiCoO_2$; compounds derived from $LiCoO_2$ obtained by substitution preferably with Al, Ti, Mg, Ni and Mn, for example $LiAl_xNi_yCo_{(1-x-y)}O_2$ wherein x<0.5 and y<1, $LiNi_xMn_xCo_{1-2x}O_2$; $LiMn_2O_4$; $LiNiO_2$; compounds derived from $LiMn_2O_4$ obtained by substitution, preferably with Al, Ni and Co; $LiMnO_2$; compounds derived from $LiMnO_2$ obtained by substitution preferably with Al, Ni, Co, Fe, Cr and Cu, for example $LiNi_{0.5}O_2$; olivins $LiFePO_4$, $Li_2FeSiO_4$, $LiMnPO_4$, $LiCoPO_4$; iron phosphates and sulfates either hydrated or not; $LiFe_2(PO_4)_3$; vanadyl phosphates and sulfates either hydrated or not, for example $VOSO_4$, $nH_2O$ and $Li_xVOPO_4$, $nH_2O$ (0<x<3, 0<n<2); $Li_{(1+x)}V_3O_8$, 0<x<4, $Li_xV_2O_5$, $nN_2O$, with 0<x<3 and 0<n<2; and mixtures thereof.

In the negative electrode, the electrochemically active material may be selected from among the compounds already mentioned above in the present description; and from among the carbonaceous compounds such as natural or synthetic graphites and disordered carbons; the lithium alloys of the $Li_xM$ type with M=Sn, Sb, Si; the compounds $Li_xCu_6Sn_5$ with 0<x<13; iron borates; simple oxides with reversible decomposition, for example CoO, $CO_2O_3$, $Fe_2O_3$; pnicures, for example $Li_{(3-x-y)}Co_yN$, $Li_{(3-x-y)}Fe_yN$, $Li_xMnP_4$, $Li_xFeP_2$; $Li_xFeSb_2$; and insertion oxides such as titanates, for example $TiO_2$, $Li_4Ti_5O_{12}$, $Li_xNiP_2$, $Li_xNiP_3$, $MoO_3$ and $WO_3$ and mixtures thereof, or of any material known to the man skilled in the art in this technical field.

The optional electron conducting additive may be selected from among metal particles such as Ag particles, graphite, carbon black, carbon fibers, carbon nanowires, carbon nanotubes and the electron conducting polymers, and mixtures thereof.

The current collectors are generally made of copper for the negative electrode and made of aluminium for the positive electrode.

Between the positive electrode, more exactly the current collector of the positive electrode (28) and the first main surface (21) of the membrane with an electrolyte is generally found the same electrolyte as the one confined in the pores of the membrane, inside the nanotubes. However, this electrolyte which is found between the positive electrode, more exactly the current collector of the positive electrode (28) and the first main surface (21) of the membrane with an electrolyte is a «bulk» electrolyte not confined to the difference of the electrolyte which is inside the nanotubes (see also FIG. 8).

This «bulk» electrolyte, not confined, is generally in contact with the positive electrode, more exactly the current collector of the positive electrode (28) and the first main surface (21) of the membrane with an electrolyte, and is generally in fluidic communication with the electrolyte confined inside the pores (see also FIG. 8).

In the same way, between the negative electrode, more exactly the current collector of the negative electrode (27) and the second main surface (22) of the membrane with an electrolyte is generally found the same electrolyte as the one confined in the pores of the membrane, inside the nanotubes. However, this electrolyte which is found between the negative electrode, more exactly the current collector of the negative electrode (27) and the second main surface (22) of the membrane with an electrolyte is a «bulk» electrolyte not confined to the difference of the electrolyte which is inside the nanotubes (see also FIG. 8).

This «bulk» electrolyte, not confined is generally in contact with the negative electrode more exactly the current collector of the negative electrode (27) and the second main surface (22) of the membrane with an electrolyte, and is generally in fluidic communication with the electrolyte confined inside the pores (see also FIG. 8).

Figure 3:
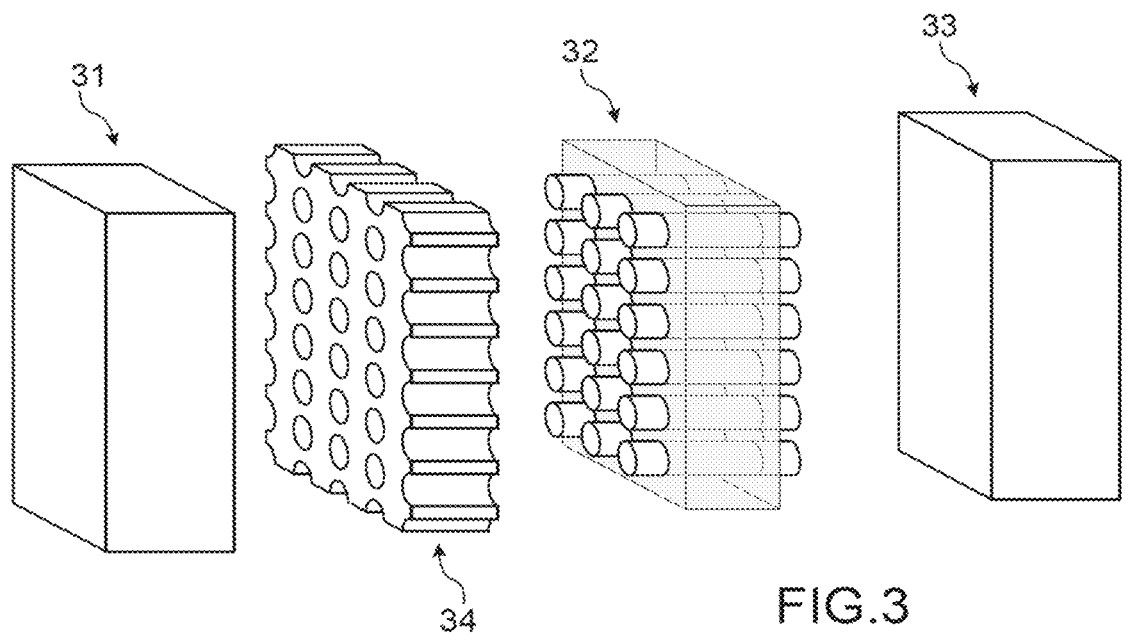
FIG. 3 is a schematic view of a particular embodiment of a lithium battery, accumulator comprising the membrane with an electrolyte according to the invention.

FIG. 3 shows a particular embodiment of an accumulator, battery, such as a lithium accumulator, battery according to the invention.

This battery comprises a negative electrode (31) for example a negative lithium metal electrode, a membrane with an electrolyte according to the invention (32), and a positive electrode (33).

The membrane with an electrolyte (32) comprises an electrolyte, for example an ionic liquid containing a lithium salt, confined in pores defined by carbon nanotubes, for example with a diameter from 2 to 8 nm.

The membrane with an electrolyte according to the invention (32), comprising CNTs which are electron conductors, the operation of the device optionally requires the insertion of a medium which is both a porous and good electric insulating medium (34) between the membrane comprising CNTs (32) and one of the two electrodes.

The insulating porous medium may for example be a porous membrane or an assembly of the sol-gel type. It is desirable, but not necessary that the pores of this insulating porous medium be macroscopically oriented. The diameter of the pores of this insulating porous medium should be greater than the diameters of the CNTs.

As a porous membrane (34), a porous alumina membrane, such as a membrane made of "Anodic Aluminum Oxide" or "AAO", may be used. These are ceramic membranes (very good electrical insulator) with a side of a few centimeters, for example from 0.1 to 100 and of a few hundred of microns in thickness, for example from 1 to 500.

In FIG. 3, such a membrane made of a porous alumina (34) is inserted between the negative electrode (31) and the membrane with an electrolyte (32) according to the invention.

Figure 4:
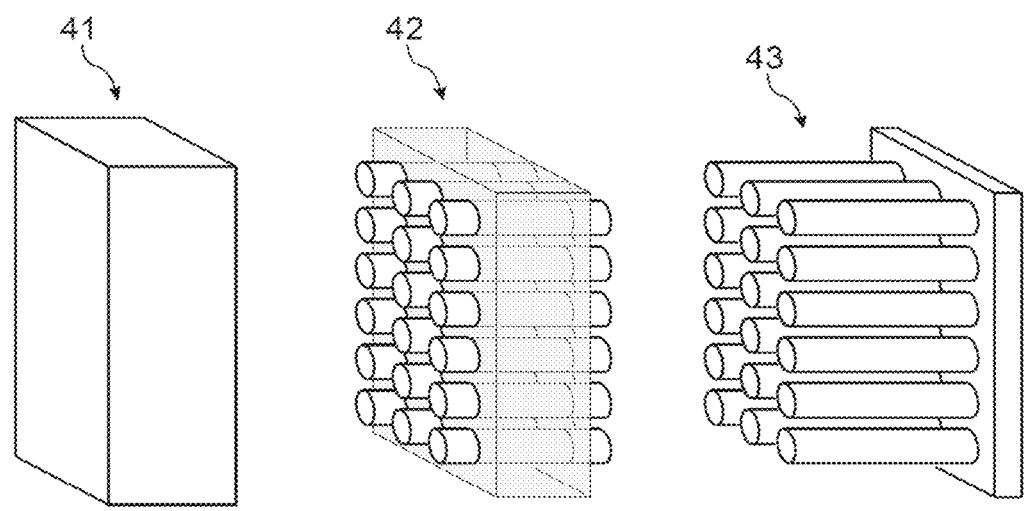
FIG. 4 is a schematic view of another particular embodiment of a lithium battery, accumulator, a so called «Full 1D» lithium battery, accumulator, comprising the membrane with an electrolyte according to the invention.

FIG. 4 shows another particular embodiment of an accumulator, battery, such as a lithium battery according to the invention which may be called a lithium «Full 1D» battery.

This battery comprises a negative electrode (41) for example a negative lithium metal electrode, a membrane with an electrolyte according to the invention (42), and a positive electrode (43).

The membrane with an electrolyte according to the invention (42) comprises an electrolyte, for example an ionic liquid containing a lithium salt, confined in pores defined by carbon nanotubes CNTs, for example with a diameter from 2 to 8 nm.

But in this embodiment, during the preparation of the membrane with an electrolyte and before conversion of the carpets of CNTs to a membrane, the hybridization of the carbon atoms of the CNTs was modified by grafting a polymer.

From this fact, the CNTs then become electronically insulating and the porous medium to be inserted between the membrane with an electrolyte according to the invention, and one of the electrodes becomes superfluous (see FIG. 4).

The positive electrode (43) of the accumulator, battery, according to this embodiment may be any known positive electrode, however in FIG. 4, the illustrated positive electrode (43) is an electrode obtained by functionalization of the CNT carpets with electro-active species, redox species like for example Anthraquinone AAQ.

The accumulators, batteries which comprise the membrane with an electrolyte, for example with a polymeric electrolyte, according to the invention may notably be used for automobile propulsion like batteries in electric or hybrid vehicles, like batteries for supplying power to portable electronic apparatuses, such as computers, telephones, watches and portable game consoles; more generally like batteries for supplying power to electronic apparatuses such as computers, video players, MP3, MP4 players etc.; like batteries for supplying power to electronic apparatuses loaded on board for example of aircrafts; like batteries for storing the energy produced by intermittent electricity generating devices, like wind turbines and solar panels.

The invention will now be described with reference to the following examples, given as an illustration and not as a limitation.

EXAMPLES

Example 1

In this example, a membrane with an electrolyte according to the invention is prepared.

The method for preparing this membrane with an electrolyte according to the invention comprises four successive steps.

Step 1.

During this step (FIG. 1A) a carpet or a forest of multi-walled carbon nanotubes is prepared, synthesized on a substrate, by a chemical vapor deposition method ("CVD").

The growth substrate is a silicon «wafer» on which is deposited by a ALD ("Atomic Layer Deposition") method an aluminium layer with a thickness of 20 nm.

On this alumina layer, an iron layer with a thickness of 1 nm playing the role of a catalyst is deposited by evaporation with an electron gun.

Just before proceeding with the growth of the nanotubes, the substrate provided with the iron layer undergoes two successive treatments with air plasmas at the pressure of 0.3 mbars.

The first treatment is a treatment with a period of 20 minutes with a power of 80 W, and the second is a treatment with a period of 20 minutes at a power of 30 W.

The substrate is then introduced into a chemical vapor deposition enclosure CVD including a network of 10 filaments mounted in parallel.

The filaments are located at 1 cm from the sample holder, consisting of a sole, and they are spaced apart by 1 cm.

The filaments are heated by Joule effect with a power of 800 W.

The gas mixture consisting of 20 sccm of acetylene, 50 sccm of hydrogen and 110 sccm of helium is introduced in cold conditions in the CVD enclosure at a pressure of 0.9 mbars.

The sole is brought to a temperature of 400° C. in 10 minutes, and then a plateau is observed at the temperature of 400° C. for a period of 20 minutes or 45 minutes.

After having observed a plateau at 400° C. for a period of 20 minutes, a carpet of carbon nanotubes is obtained for which the average diameter is 4.5 nm and the height, length is of 200 μm.

If the plateau is increased to 45 minutes, carpets of carbon nanotubes are also obtained with an average diameter of 4.5 nm, but for which the height, length is 400 μm.

The density of the nanotubes over the surface of the substrate is greater than $10^{11}$ cm$^{-2}$.

FIG. 5 is a photograph taken with a scanning electron microscope of the carpet or forest of carbon nanotubes obtained at the end of step 1.

Step 2.

During this step the carpet of carbon nanotubes is transformed into a membrane by bridging, filling in the empty space between the carbon nanotubes CNTs of the carpet of carbon nanotubes, of the forest of carbon nanotubes with a polymer (FIG. 1B).

The polymer is polystyrene for which the molecular mass is 350,000 g/mol.

This polymer is dissolved in toluene for obtaining a solution at 20% by mass.

This solution is poured onto the carpet, the forest, of carbon nanotubes, and then the solvent is left to evaporate.

At the end of this step, a membrane is obtained wherein the carbon nanotubes are surrounded by a polymer matrix.

Generally the end of the carbon nanotubes opposite to the substrate is covered with polymer (FIG. 1B) and excess polymer is therefore present on the nanotubes.

Step 3.

During this step, mechanical polishing is achieved of both faces of the membrane obtained in step 2 in order to remove the excess polymer, to remove the substrate and to open the carbon nanotubes at both of their ends (FIG. 1C).

FIG. 6 is a photograph taken with the scanning electron microscope of the membrane obtained at the end of step 3.

Step 4.

During this step, the inside, the core of the carbon nanotubes is filled with an electrolyte.

This electrolyte may consist of the ionic liquid 1-octyl-3-methylimidazolium tetrafluoroborate (OMIMBF$_4$), or else of the ionic liquid BMIMTFSI 1-butyl-3-methylimidazolium bis(trifluoromethylsulfonyl imide) or else of POE-LiTFSI ($M_{POE}$=500 g/mol, 29% by mass of LiTFSI).

The filling is achieved by simple spontaneous, imbibition, impregnation or in vacuo of the core of the CNTs in contact with the electrolyte, for example with the ionic liquid.

In the following examples 2 and 3, the properties of the membrane with an electrolyte according to the invention, prepared in Example 1, were measured.

In Example 2, the diffusion coefficient or more exactly the self-diffusion coefficient ("self-diffusion coefficient") of the ionic liquid OMIMBF$_4$ confined in the membrane of carbon nanotubes prepared in Example 1 was measured at room temperature.

The measurement was made by Nuclear Magnetic Resonance (NMR) with a pulsed field gradient ("Pulsed Field Gradient Nuclear Magnetic Resonance" or "PFG-NMR") of Fluorine 19 (FIG. 7).

In Example 2, additional measurements by PFG-NMR of hydrogen, of Fluorine 19 or of Lithium 7 were also carried out, of the self-diffusion coefficients ($D_S$) of the different electrolytes, mentioned above, confined in the membrane of carbon nanotubes CNTs prepared in Example 1.

In Example 3, the conductivity of the ionic liquid (OMIMBF$_4$) confined in the membrane of carbon nanotubes was measured at room temperature.

The measurement was made by impedance spectroscopy (FIGS. 8 and 9).

Example 2

In this example, first of all the diffusion coefficient of the ionic liquid OMIMBF$_4$ confined in the membrane of carbon nanotubes CNTs prepared in Example 1 at room temperature, is measured.

The measurement is made by Nuclear Magnetic Resonance (NMR) with a pulsed field gradient ("Pulsed Field Gradient Nuclear Magnetic Resonance" or "PFG-NMR") of Fluorine 19 (FIG. 7).

For comparison purposes, the diffusion coefficient of the same ionic liquid as the one confined in the pores of the membrane of CNTs of Example 1, i.e. 1-octyl-3-methylimidazolium tetrafluoroborate, (OMIMBF$_4$), but not confined in the pores, is also measured. This non-confined ionic liquid is also called a "volumic" or "bulk" ionic liquid.

The results of these measurements are plotted in FIG. 7.

This figure shows that at room temperature, the self-diffusion coefficient of the ionic liquid (1-octyl-3-methylimidazolium tetrafluoroborate, OMIMBF$_4$) confined according to the invention in a membrane of carbon nanotubes for which the average internal diameter of the pores is 4 nm, is about 3 times greater than the self-diffusion coefficient of the same non-confined volumic, bulk ionic liquid.

In other words, an increase by a factor of about three is obtained of the self-diffusion coefficient because of the confinement, since this self-diffusion coefficient is 4.4 (+/−0.3) $10^{-8}$ cm$^2$ s$^{-1}$ for the volumic, bulk ionic liquid, and 1.3 (+/−0.2) $10^{-7}$ cm$^2$ s$^{-1}$ for the same ionic liquid confined in the membrane.

Next, additional measurements are carried out by PFG-NMR of hydrogen, of Fluorine 19 or of Lithium 7, of the self-diffusion coefficients ($D_S$) of different electrolytes confined in the membrane of carbon nanotubes CNTs prepared in Example 1.

These electrolytes are the following:

an electrolyte consisting of OMIMBF$_4$; or an electrolyte consisting of BMIMTFSI 1-butyl-3-methylimidazolium bis(trifluoromethylsulfonyl imide); or an electrolyte consisting of POE-LiTFSI ($M_{POE}$=500 g/mol, 29% by mass of LiTFSI).

The measurements carried out are the following

OMIMBF$_4$: $^1$H-PFG-NMR measurements (cation dynamics) and $^{19}$F (anion dynamics) at room temperature (25° C.) and at 55° C.;

BMIMTFSI: $^1$H-PFG-NMR measurements (cation dynamics) and $^{19}$F (anion dynamics) at room temperature;

PEO-LiTFSI ($M_{POE}$=500 g/mol, 29% by mass of LiTFSI): $^1$H-PFG-NMR measurements (PEO dynamics)$^{19}$F (anion dynamics), $^7$Li (Li dynamics) at room temperature.

For comparison purposes, the self-diffusion coefficients ($D_S$) of these same electrolytes but not confined in the pores of the membrane of CNTs are also measured at room temperature.

These non-confined electrolytes are also called "volumic" or "bulk" electrolytes.

The results of the additional measurements carried out are grouped in the Table 1 below.

TABLE 1

Self-diffusion coefficients ($D_s$) of the electrolytes OMIMBF$_4$, BMIMTFSI and PEO-LiTFSI measured by PFG-NMR ($^1$H, $^{19}$F, and $^7$Li) confined in the CNT membrane ("@CNT") and not confined in the membrane ("Bulk"). The ratio or $D_{S\,Confined}/D_{S\,bulk}$ ratio is also indicated.

| Sample | $^1$H-25° C. ($10^8$ cm$^2$/s) | $^{19}$F-25° C. ($10^8$ cm$^2$/s) | $^1$H-55° C. ($10^8$ cm$^2$/s) | $^1$Li-25° C. ($10^8$ cm$^2$/s) |
|---|---|---|---|---|
| OMIMBF$_4$ | 3.7 ± 0.2 | 4.7 ± 0.3 | 14.5 ± 1.0 | — |
| OMIMBF$_4$ @ NTC | 8.2 ± 0.8 | 11.5 ± 1.4 | 24 ± 3 | — |
| Ratio | 2.2 ± 0.3 | 2.6 ± 0.4 | 1.7 ± 0.3 | — |
| BMIMTFSI | 27 ± 2 | 21.5 ± 2 | — | — |
| BMIMTFSI @ NTC | 31.0 ± 3 | 22 ± 2 | — | — |
| Ratio | 1.1 ± 0.2 | 1.0 ± 0.1 | — | — |
| PEO-LiTFSI @ NTC | 86 ± 0.6 | 10.1 ± 1 | — | 6.9 ± 1.1 |

TABLE 1-continued

Self-diffusion coefficients ($D_s$) of the electrolytes OMIMBF$_4$, BMIMTFSI and PEO-LiTFSI measured by PFG-NMR ($^1$H, $^{19}$F, and $^7$Li) confined in the CNT membrane ("@CNT") and not confined in the membrane ("Bulk"). The ratio or $D_{S\text{-}Confined}/D_{S\text{-}bulk}$ ratio is also indicated.

| Sample | $^1$H-25° C. ($10^8$ cm$^2$/s) | $^{19}$F-25° C. ($10^8$ cm$^2$/s) | $^1$H-55° C. ($10^8$ cm$^2$/s) | $^1$Li-25° C. ($10^8$ cm$^2$/s) |
|---|---|---|---|---|
| PEO-LiTFSI bulk | 6 ± 0.4 | 10 ± 0.5 | — | 5.2 ± 0.4 |
| Ratio | 1.4 ± 0.2 | 1 ± 0.3 | — | 1.3 ± 0.2 |

Confined in the CNTs, the mobility of BMIMTFSI is not altered relatively to the non-confined electrolyte (table 1: ratio≈1).

However, this result shows that there is no (or very little) interactions with the internal surface of the CNTs.

At 55° C., the mobility of OMIMBF$_4$ increases under confinement by a factor ~1.7.

When the temperature decreases, this effect is further increased. Indeed an increase in the mobility (of the cation and of the anion) is observed by a factor 2-3.

A possible interpretation is the modification of the self-organization at the nanometric scale of OMIMBF$_4$. Under confinement, this nano-organization decreases and facilitates the mobility at the micrometric scale (measurement scale of the PFG-NMR).

The results obtained for OMIMBF$_4$ at 55° C. and BMIMTFSI correspond with this explanation: in both cases, the nanostructuration of the ionic liquid LI is less pronounced and the $D_{S\text{-}confined}/D_{S\text{-}bulk}$ ratio is consequently less important.

The results obtained with POE-LiTFSI show that the principle of the measurement also operates for this type of electrolyte, although the gain in mobility is low.

However by reducing the diameter of the CNTS, a clearly greater gain is expected.

Example 3

In this example, the conductivity of the ionic liquid confined in the membrane of carbon nanotubes CNTs prepared in Example 1 is measured at room temperature.

The measurement is conducted by impedance spectroscopy (FIG. 8).

For comparison purposes, the conductivity of the same ionic liquid as the one confined in the pores of the membrane of CNTS of Example 1, i.e. 1-octyl-3-methylimidazolium tétrafluoroborate, (OMIMBF$_4$), but non-confined in the pores, is also measured at room temperature. This non-confined ionic liquid is also called a «volumic» or «bulk» ionic liquid.

This schematic layout of the device which gave the possibility of measuring by impedance spectroscopy at room temperature, the conductivity of the volumic, bulk, non-confined ionic liquid OMIMBF$_4$, and in a membrane of carbon nanotubes is shown in FIG. 8.

This device comprises an upper electrode (71), and a lower electrode (72) separated by a distance L. Between both of these electrodes (71, 72) is placed the membrane according to the invention, prepared in Example 1 (73), which comprises carbon nanotubes (74) (conveniently only a single carbon nanotube has been illustrated) inside which is confined the ionic liquid OMIMBF4 (75) in a polystyrene matrix (76).

For ensuring perfect electric contact between the membrane (73) confining the ionic liquid (75) (the confined ionic liquid is also noted as «IL@CNT» and its impedance is $Z_{IL@CNT}$) and the electrodes (71, 72), an excess of volumic ionic liquid also called bulk liquid with a known thickness, i.e. of the order of a few millimeters is maintained on each side of the membrane.

Thus between the lower surface of the electrode (71) and the membrane is found some volumic, bulk ionic liquid (77) of known thickness E1 (79), and between the membrane (73) and the lower surface of the electrode (72) is found volumic, bulk ionic liquid (78) of a same known thickness E2 equal to E1 (710). The total impedance of the volumic, bulk ionic liquid with a total thickness of E1+E2 is therefore $Z_{bulk}$.

The active surface (711) of the ionic liquid (77) or (78) may be designated by S.

The impedance of the volumic, bulk ionic liquid (77) of known thickness E1 (79), and the impedance of the volumic, bulk ionic liquid of a known thickness E2 (710) is therefore $Z_{bulk}/2$.

The total impedance $Z_{tot}$ of the system consisting of the volumic, bulk ionic liquid, and of the confined ionic liquid is therefore the following: $Z_{tot}=Z_{bulk}+Z_{IL@CNT}$ The results of the measurements made in this example are plotted in FIG. 10 which gives the Cole-Cole representation of the electric impedance of the volumic, bulk electrolyte («bulk electrolyte») and of the electrolyte confined in the nanotubes, of a membrane comprising carbon nanotubes in a polystyrene matrix.

In order to give an estimation of the uncertainty of the measurement, in each case, two successive measurements are illustrated.

The electric impedance of the volumic, bulk electrolyte ($Z_{bulk}$) and the total impedance of the system ($Z_{tot}$), are indicated in FIG. 10.

The resistance of the confined ionic liquid in the nanotubes CNTs of the membrane is $Z_{IL@CNT\text{-}PS}=Z_{tot}-Z_{bulk}\sim1500-1000=500\Omega$.

$R_{CNT}=1.5$ nm, $\rho_{CNT}=3.0\times10^{11}$ NTC/cm$^2$, $e_{CNT}=125$ μm, and S=0.5 cm$^2$, are respectively the internal radius, the surface density, the length of the CNTs (or equivalently the thickness of the membrane), and the useful contact surface between the electrodes and the membrane comprising carbon nanotubes in a polystyrene matrix.

The conductivity of the electrolyte confined in the membrane comprising carbon nanotubes is in a polystyrene matrix is $\sigma_{IL@CNT\text{-}PS}=e_{CNT}/(Z_{IL@CNT\text{-}PS}\times\pi R_{CNT}^2\times\rho_{CNT}/S=0.236$ S/m.

The conductivity of the volumic, bulk electrolyte under the same conditions is $\sigma_{IL\ bulk}=0.07$ S/m.

Under confinement, the gain in conductivity is therefore 3.4±1.

Examples 3 and 4 show that the confinement of the electrolyte gives the possibility of obtaining a greater "self-diffusion coefficient" and consequently a greater ionic conductivity of the electrolyte (a factor of 3.4 is shown here), than those of the volumic, bulk electrolyte.

The invention claimed is:

1. A battery, comprising:
   a positive electrode;
   a negative electrode; and
   a porous membrane with an electrolyte between the positive and negative electrodes, the membrane having a first main surface and a second main surface separated by a thickness, wherein the membrane comprises:
carbon nanotubes connecting the first main surface and the second main surface, defining through-pores or through-channels open at both of their ends, having a diameter of less than or equal to 100 nm, oriented in the direction of the thickness of the membrane and all substantially parallel and separated by a space, on the totality of the thickness of the membrane;
at least one solid material totally filling the space between the carbon nanotubes; and
an electrolyte confined inside the carbon nanotubes such that a chemical composition of the confined electrolyte is the same in all the inside of the carbon nanotubes.

2. The battery according to claim 1, wherein the first and the second main surfaces are planar and parallel, the membrane is a planar membrane and the nanotubes, the pores or channels, are substantially aligned, or aligned, perpendicularly to said surface.

3. The battery according to claim 1, wherein the carbon nanotubes are functionalized on their outer wall in order to make them electronically insulating, or else the carbon nanotubes are functionalized on their outer wall with redox species and/or electroactive species.

4. The battery according to claim 1, wherein the carbon nanotubes have an internal diameter of from 1 to 100 nm.

5. The battery according to claim 1, wherein the carbon nanotubes and the pores or channels have a length of from 10 microns to 100 mm.

6. The battery according to claim 1, wherein the solid material is selected from the group consisting of electronically insulating materials and electronically conducting materials for which the outer surface, in contact with the outside of the membrane, has been made electronically insulating.

7. The battery according to claim 1, wherein the solid material is selected from the group consisting of organic polymers, metals and metal oxides.

8. The battery according to claim 1, wherein the electrolyte is at least one selected from the group consisting of a proton carrier or proton conductor, a zwitterion ionic liquid, an acid dissolved in an organic polymer, an ionic liquid, an ionic liquid comprising an ionic conducting salt, a liquid organic solvent or an organic polymer comprising an ionic conducting salt, an ionic liquid in an organic polymer, a mixture of an organic polymer and of an organic solvent, a mixture of an ionic liquid and of an organic solvent, a mixture of an ionic liquid, of an organic solvent and of a salt of an alkaline or earth-alkaline metal, a mixture of an organic polymer, of an organic solvent and of a salt of an alkaline or earth-alkaline metal, and a mixture of a salt of an alkaline or earth-alkaline metal in a protonic ionic liquid.

9. The battery according to claim 8, wherein the organic polymer is a polymer selected from the group consisting of homopolymers and copolymers of ethylene oxide, and their derivatives.

10. The battery according to claim 8, wherein the organic polymer has a molar mass of less than $10^6$ g/mol.

11. The battery according to claim 8, wherein the ionic conducting salt is a salt of an alkaline metal or a salt of an earth-alkaline metal.

12. The battery according to claim 11, wherein the ionic conducting salt is a lithium salt, selected from the group consisting of $LiAsF_6$, $LiClO_4$, $LiBF_4$, $LiPF_6$, lithium bis (oxalato)borate (LiBOB), LiODBF, $LiB(C_6H_5)$, $LiRFSO_3$, $LiCH_3SO_3$, $LiN(R_FSO_2)_2$, $LiC(R_FSO_2)_3$, wherein $R_F$ is selected from the group consisting of a fluorine atom and a perfluoroalkyl group comprising from 1 to 9 carbon atoms, or a sodium salt analogous to the lithium salts thereof but comprising a sodium ion instead of a lithium ion.

13. The battery according to claim 8, wherein the concentration of ionic conducting salt in the electrolyte is from 1 to 50% by mass based on the mass of the electrolyte.

14. The battery according to claim 1, wherein the electrolyte totally fills the carbon nanotubes.

15. A method for preparing the battery according to claim 1, comprising sequentially:
a) growing carbon nanotubes, all substantially parallel, and separated by a space, on a surface of a substrate provided with a growth catalyst of carbon nanotubes;
b) totally filling said space between the carbon nanotubes with a solid material;
or else the following a1) is carried out:
a1) growing carbon nanotubes, all substantially parallel, and separated, on a surface of a substrate and inside the pores of a porous solid material with oriented pores;
and then, at the end of b) or of a1), the following c) is carried out:
c) removing the substrate and, any possible solid material in excess, and opening both ends of the carbon nanotubes;
and then, at the end of c), the following d) is carried out to obtain the porous membrane with an electrolyte:
d) filling the inside of the nanotubes with an electrolyte;
and then, at the end of d), providing positive and negative electrodes such that the membrane is positioned between the positive and negative electrodes.

16. The method according to claim 15, wherein the growth substrate is a silicon wafer, or a stainless steel or aluminium sheet on which is deposited an alumina layer, and the growth catalyst of the carbon nanotubes is deposited on the alumina layer.

17. The method according to claim 15, wherein the growth catalyst of the carbon nanotubes is selected from the group consisting of iron, nickel, cobalt, and alloys thereof.

18. The method according to claim 15, wherein the carbon nanotubes are grown by a chemical vapor deposition method CVD.

19. The method according to claim 15, wherein the solid material is an organic polymer and b) is carried out:
either by dissolving the organic polymer in a solvent in order to form a solution of the organic polymer, by totally filling the space between the carbon nanotubes with the solution of the organic polymer and by evaporating the solvent;
or by heating the organic polymer in the absence of any solvent above its glass transition temperature (Tg) or above its melting point for making it fluid, and by leaving the fluid polymer be absorbed in the space between the carbon nanotubes;
or by filling the space between the carbon nanotubes with a mixture comprising organic monomers, or organic oligomers modified by reactive functions, or organic copolymers, and further one or several photosensitive and/or thermo-sensitive free radicals initiator(s);
and then by cross-linking the mixture thermally or by means of photon radiation.

20. The method according to claim 15, wherein the solid material is a metal, and then b) is carried out by depositing said metal by an electrochemical deposition method in the space between the carbon nanotubes, or else the solid material is a metal oxide and then b) is carried out by depositing said metal oxide by an electrochemical deposition method, or by a sol-gel method, in the space between the carbon nanotubes.

21. The method according to claim 15, wherein b) is carried out by projecting said solid material in the space between the carbon nanotubes.

22. The method according to claim 15, wherein c) is carried out by mechanical polishing and/or plasma etching.

23. The battery according to claim 3, wherein the carbon nanotubes are functionalized on their outer wall in order to make them electronically insulating by fluorination or by an organic compound.

24. The battery according to claim 8, wherein the electrolyte comprises a proton carrier or a proton conductor, and the proton carrier or the proton conductor is a protonic ionic liquid or a protonic conducting polymer.

25. The battery according to claim 8, wherein the ionic conducting salt is a salt of an alkaline metal or a salt of an earth-alkaline metal.

26. The battery according to claim 8, wherein the electrolyte comprises a mixture of a salt of an alkaline or earth-alkaline metal in a protonic ionic liquid, where the alkaline or earth-alkaline metal is lithium.

27. The battery according to claim 12, wherein
$LiR_FSO_3$ is $LiCF_3SO_3$,
$LiN(R_FSO_2)_2$ is $LiN(CF_3SO_2)_2$ (LiTFSI) or $LiN(C_2F_5SO_2)_2$ (LiBETI), and
$LiC(R_FSO_2)_3$ is $LiC(CF_3SO_2)_3$ (LiTFSM).

28. The battery according to claim 12, wherein $R_F$ is selected from the group consisting of a fluorine atom and a perfluoroalkyl group comprising from 1 to 8 carbon atoms.

* * * * *